(12) United States Patent
Laroche et al.

(10) Patent No.: US 10,419,774 B2
(45) Date of Patent: Sep. 17, 2019

(54) PALETTE MODE IN HEVC

(71) Applicant: CANON KABUSHIKI KAISHA, Tokyo (JP)

(72) Inventors: Guillaume Laroche, Melesse (FR); Christophe Gisquet, Rennes (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

(21) Appl. No.: 15/102,507

(22) PCT Filed: Dec. 10, 2014

(86) PCT No.: PCT/EP2014/077296
§ 371 (c)(1),
(2) Date: Jun. 7, 2016

(87) PCT Pub. No.: WO2015/086717
PCT Pub. Date: Jun. 18, 2015

(65) Prior Publication Data
US 2016/0309177 A1 Oct. 20, 2016

(30) Foreign Application Priority Data

Dec. 10, 2013 (GB) .................................. 1321850.8
Dec. 18, 2013 (GB) .................................. 1322475.3
(Continued)

(51) Int. Cl.
*H04N 19/463* (2014.01)
*H04N 19/105* (2014.01)
(Continued)

(52) U.S. Cl.
CPC ......... *H04N 19/463* (2014.11); *H04N 19/105* (2014.11); *H04N 19/159* (2014.11);
(Continued)

(58) Field of Classification Search
None
See application file for complete search history.

(56) References Cited

U.S. PATENT DOCUMENTS 6,023,558 A 2/2000 Grabowski
7,903,740 B2 3/2011 Chujoh et al.
(Continued)

FOREIGN PATENT DOCUMENTS

CN 1625893 A 6/2005
CN 1713719 A 12/2005
(Continued)

OTHER PUBLICATIONS

Guo et al., "Non-RCE3: Modified Palette Mode for Screen Content Coding", 14. JCT-VC Meeting; Jul. 25, 2013-Aug. 2, 2013; Vienna; (Joint Collaborative Team on Video Coding of ISO/IEC JTC1/SC29/WG11 and ITU-T SG. 16); No. JCTVC-N0249, Jul. 16, 2013 (Jul. 16, 2013), XP030114767.*
(Continued)

*Primary Examiner* — William C Vaughn, Jr.
*Assistant Examiner* — Stuart D Bennett
(74) *Attorney, Agent, or Firm* — Canon U.S.A., Inc. IP Division

(57) ABSTRACT

A method for determining encoding parameters for encoding indexes of a block of indexes used for encoding a coding unit of an image according to a palette, each index being related to one of the pixels forming the coding unit, the palette comprising a set of indexes associated to pixel values. The method comprises:
generating each index of the block of indexes related to the coding unit from the palette based on corresponding encoding parameters, and
if indexes of the block of indexes cannot be generated from the palette for at least one pixels of the coding
(Continued)

unit, generating index values corresponding to escape values for replacing said indexes of the block of indexes which cannot be generated, wherein encoding parameters corresponding to an index are determined according to the spatial neighborhood of said pixel regarding to an encoding order.

8 Claims, 24 Drawing Sheets

(30) Foreign Application Priority Data

Mar. 14, 2014 (GB) .................................. 1404596.7
Aug. 1, 2014 (GB) .................................. 1413725.1

(51) Int. Cl.
H04N 19/159 (2014.01)
H04N 19/182 (2014.01)
H04N 19/93 (2014.01)
H04N 19/176 (2014.01)

(52) U.S. Cl.
CPC ......... *H04N 19/176* (2014.11); *H04N 19/182* (2014.11); *H04N 19/93* (2014.11)

(56) References Cited

U.S. PATENT DOCUMENTS

| | | |
|---|---|---|
| 8,548,064 B2 | 10/2013 | Kitahara et al. |
| 2003/0048943 A1 | 3/2003 | Ishikawa |
| 2003/0202602 A1 | 10/2003 | Apostolopoulos et al. |
| 2004/0156543 A1 | 8/2004 | Gardella et al. |
| 2004/0213469 A1 | 10/2004 | Apostolopoulos |
| 2005/0276489 A1 | 12/2005 | Ishikawa |
| 2007/0253492 A1 | 11/2007 | Shelton |
| 2009/0010533 A1 | 1/2009 | Hung |
| 2010/0046628 A1 | 2/2010 | Bhaskaran et al. |
| 2013/0317833 A1 | 11/2013 | Davis |
| 2015/0010053 A1 | 1/2015 | Xu |
| 2015/0016501 A1* | 1/2015 | Guo .................. G06T 9/00 375/240.02 |

FOREIGN PATENT DOCUMENTS

| | | |
|---|---|---|
| CN | 1716998 A | 1/2006 |
| CN | 101340587 A | 1/2009 |
| CN | 101645173 A | 2/2010 |
| CN | 105814889 A | 7/2016 |
| EP | 3020198 A2 | 5/2016 |
| EP | 3080990 A2 | 10/2016 |
| JP | 2010-226532 A | 10/2010 |
| JP | 2011-035807 A | 2/2011 |
| JP | 4736619 B2 | 7/2011 |
| JP | 4747917 B2 | 8/2011 |
| JP | 5222870 B2 | 6/2013 |
| RU | 2407223 C2 | 12/2010 |
| RU | 2420021 C2 | 5/2011 |
| RU | 2011-109206 A | 9/2012 |
| WO | 2007-013335 A1 | 2/2007 |
| WO | 2012-081162 A1 | 6/2012 |

OTHER PUBLICATIONS

Guo et al., "Non-RCE3: Modified Palette Mode for Screen Content Coding", 14. JCT-VC Meeting; Jul. 25, 2013-Aug. 2, 2013; Vienna; (Joint Collaborative Team on Video Coding of ISO/IEC JTC1/SC29/WG11 and ITU-T SG. 16); No. JCTVC-N0249, Jul. 16, 2013 (Jul. 16, 2013), XP030114767 (Year: 2013).*

Guo et al., "Non-RCE3: Modified Palette Mode for Screen Content Coding", 14. JCT-VC Meeting; Jul. 25, 2013-Aug. 2, 2013; Vienna; (Joint Collaborative Team on Video Coding of ISO/IEC JTC1/SC29/WG11 and ITU-T SG.16 ) ; URL: http://wftp3.itu.int/av-arch/jctvc-site/, No. JCTVC-N0249, Jul. 16, 2013 (Jul. 16, 2013), XP030114767, the whole document.

Gisquet et al.,"Non-RCE4: On Palette prediction modes coding", 16. JCT-VC Meeting; Jan. 9, 2014-Jan. 17, 2014; San Jose; (Joint Collaborative Team on Video Coding of ISO/!EC JTC1/SC29/WG11 and ITU-T SG.16 ); URL: http://wftp3.itu.int/av-arch/jctvc-site/, No. JCTVC-P0116-v4, Jan. 10, 2014 (Jan. 10, 2014), XP030115614, the whole document.

Gisquet et al., AhGIO: Palette index coding, 17. JCT-VC Meeting; Mar. 27, 2014-Apr. 4, 2014; Valencia; (Joint Collaborative Team on Video Coding of ISO/IEC JTC1/SC29/WG11 and ITU-T SG.16 ); URL: http://wftp3.itu.jnt/av-arch/jctvc-site/, No. JCTVC-Q0064, Mar. 17, 2014 (Mar. 17, 2014), XP030115959, the whole document.

Richardson et al., "H264/MPEG-4 Part 10 White Paper—Prediction of Intra Macroblocks", Internet Citation, Apr. 30, 2003 (Apr. 30, 2003), XP002281494, Retrieved from the Internet: URL:http://www.vcodex.com/h264.html/h264 intrapred.pdf—[retrieved on May 24, 2004], p. 5, paragraph 5-p. 6, line 2; figure 8.

Sullivan et al.,"Meeting Report of 14th JCT-VC Meeting", 14. JCT-VC Meeting; Jul. 25, 2013-Aug. 2, 2013, Vienna; (Joint Collaborative Team on Video Coding of ISO/I EC JTC1/SC29/WG11 and ITU-T SG.16 ),URL: http://wftp3.itu.int/av-arch/jctvc-site/, No. JCTVC-NIOOO, Oct. 23, 2013 (Oct. 23, 2013), XP030114945, p. 71, paragraph JCTVC-N0249.

Zhu et al., "Template-based palette prediction", 14. JCT-VC Meeting; Jul. 25, 2013-Aug. 2, 2013, Vienna, (Joint Collaborative Team on Video Coding of I SO/I EC JTC1/SC29/WG11 and ITU-T SG. 16 ), URL: http://wftp3.itu.int/av-arch/jctvc-site/, No. JCTVC-N0169-v3, Jul. 30, 2013 (Jul. 30, 2013), XP030114648, the whole document.

Communication pursuant to Article 94(3) EPC, for European Application No. 14818919.4-1208, dated Sep. 24, 2018.

Joel Sole et al., "Transform Coefficient Coding in HEVC", IEEE Transactions on Circuits and Systems for Video Technology, IEEE Service Center, Piscataway, NJ, US, vol. 22, No. 12, Dec. 1, 2012, pp. 1765-1777, XP011487805, ISSN: 1051-8215, DOI:10.1109/TCSVT.2012.2223055.

* cited by examiner

Block with levels

| 0 | 0 | 0 | 0 | 0 | 0 | 0 | 0 |
|---|---|---|---|---|---|---|---|
| 0 | 1 | 0 | 0 | 0 | 0 | 0 | 0 |
| 0 | 1 | 0 | 0 | 0 | 0 | 0 | 0 |
| 0 | 1 | 1 | 1 | 1 | 1 | 1 | 0 |
| 0 | 1 | 2 | 2 | 2 | 2 | 2 | 0 |
| 0 | 1 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |

802

PALETTE

| Level | Y | U | V |
|---|---|---|---|
| 0 | 245 | 128 | 128 |
| 1 | 0 | 145 | 102 |
| 2 | 135 | 178 | 94 |

803

Current block

Encoded level transmission

| Pred mode = 0 |
| Level = 0 |
| Run = 8 |
| Pred mode = 0 |
| Level = 1 |
| Run = 5 |
| Pred mode = 0 |
| Level = 1 |
| Run = 3 |
| Pred mode = 0 |
| Level = 2 |
| Run = 0 |

92

| Pred mode = 0 |
| Level = 1 |
| Run = 0 |
| Pred mode = 0 |
| Level = 0 |
| Run = 5 |
| Pred mode = 1 |
| Run = 31 |
| Pred mode = 0 |
| Level = 0 |
| Run = 4 |

PALETTE MODE IN HEVC

CROSS-REFERENCE TO RELATED APPLICATIONS

The application is the National Phase application of PCT Application No. PCT/EP2004/077296, filed on Dec. 10, 2014 and titled "Improved Palette mode in HEVC". This application claims the benefit under 35 U.S.C. § 119(a)-(d) of United Kingdom Patent Application No. 1321850.8, filed on Dec. 10, 2013 and titled "Palette prediction", United Kingdom Patent Application No. 1322475.3, filed on Dec. 18, 2013 and titled "Improved palette mode coding", United Kingdom Patent Application No. 1404596.7, filed on Mar. 14, 2014 and titled "Palette index coding improvement", and United Kingdom Patent Application No. 1413725.1, filed on Aug. 1, 2014 and titled "Improved palette mode in HEVC". The above cited patent applications are incorporated herein by reference in their entirety.

FIELD OF THE INVENTION

The invention relates to video coding and decoding. More precisely, the present invention is dedicated to a palette mode coding method. The Palette mode is a new coding method that has been presented in the scope of the Range Extension of the High Efficiency Video Coding (HEVC: ISO/IEC 23008-2 MPEG-H Part 2/ITU-T H.265) international standard. This method is efficient for video coding targeting "screen content" video sequence.

The current invention improves the coding efficiency of Palette mode by using an efficient coding method.

BACKGROUND OF THE INVENTION

A palette in this document is defined as a look up table having entries associating an index with a value of a pixel. Typically, but not necessary, the value of a pixel is constituted by the value of each colour component associated to the pixel, resulting in a colour palette. On the other hand, the value of a pixel may be made of a single pixel component, resulting in a monochrome palette.

This mode of encoding a block of pixel is generally referred to as Palette coding mode. It is contemplated to adopt this mode, for example, in the Range Extension of the High Efficiency Video Coding (HEVC: ISO/IEC 23008-2 MPEG-H Part 2/ITU-T H.265) international standard.

When encoding an image in a video sequence, the image is first divided into coding entities of pixels of equal size referred to as Coding Tree Block (CTB). The size of a Coding Tree Block is typically 64 by 64 pixels. Each Coding Tree Block may then be broken down into a hierarchical tree of smaller blocks which size may vary and which are the actual blocks of pixels to encode. These smaller blocks to encode are referred to as Coding Unit (CU).

The encoding of a particular Coding Unit is typically predictive. This means that a predictor block is first determined. Next, the difference between the predictor block and the Coding Unit is calculated. This difference is called the residue. Next, this residue is compressed. The actual encoded information of the Coding Unit is made of some information to indicate the way of determining the predictor block and the compressed residue. Best predictor blocks are blocks as similar as possible to the Coding Unit in order to get a small residue that could be efficiently compressed.

The coding mode is defined based on the method used to determine the predictor block for the predictive encoding method of a Coding Unit.

A first coding mode is referred to as INTRA mode. According to INTRA mode, the predictor block is built based on the value of pixels immediately surrounding the Coding Unit within the current image. It is worth noting that the predictor block is not a block of the current image but a construction. A direction is used to determine which pixels of the border are actually used to build the predictor block and how they are used. The idea behind INTRA mode is that, due to the general coherence of natural images, the pixels immediately surrounding the Coding Unit are likely to be similar to pixels of the current Coding Unit. Therefore, it is possible to get a good prediction of the value of pixels of the Coding Unit using a predictor block based on these surrounding pixels.

A second coding mode is referred to as INTER mode. According to INTER mode, the predictor block is a block of another image. The idea behind the INTER mode is that successive images in a sequence are generally very similar. The main difference comes typically from a motion between these images due to the scrolling of the camera or due to moving objects in the scene. The predictor block is determined by a vector giving its location in a reference image relatively to the location of the Coding Unit within the current image. This vector is referred to as a motion vector. According to this mode, the encoding of such Coding Unit using this mode comprises motion information comprising the motion vector and the compressed residue.

We focus in this document on a third coding mode called Palette mode. According to a first variant of the Palette mode, it is possible to define a predictor block for a given Coding Unit as a block of indexes from a palette: for each pixel location in the predictor block, the predictor block contains the index associated with the pixel value in the Palette which is the closest to the value of the pixel having the same location (i.e. colocated) in the coding unit. A residue representing the difference between the predictor block and the coding unit is then calculated and encoded. Entry indexes in the Palette are also known as "levels".

When using the Palette mode according to this first variant, the predictor block of indexes has to be transmitted in the bitstream. For this transmission, the predictor block of indexes is binary encoded using three syntax elements. A first syntax element, called "Pred mode" allows distinguishing between two encoding modes. In a first mode corresponding to a Pred mode having the value 0 (also known as "copy left mode","left prediction mode" or "index mode"), the value of the level to be encoded has to be transmitted in the bitstream. In a second mode corresponding to a Pred mode having the value 1, the value of the level to be encoded is obtained from the value of the above pixel in the predictor block. The level does not have to be transmitted.

According to a second variant of the Palette mode, it is also possible to define an index block for predicting a given Coding Unit from a palette: for each pixel location in the CU, the index block contains the index associated with the pixel value in the Palette which is representative of the value of the pixel having the same location (i.e. colocated) in the coding unit. Additional index values named "Escape values" are also generated if a pixel value cannot be associated to an index value from the Palette. This "Escape value" indicates that the corresponding pixel value is directly encoded.

According to this second variant, the index block and the escape values are transmitted in the bitstream with the Palette. The same syntax elements as mentioned for the first variant are used It is worth noting that while the block of indexes is not strictly speaking a part of an image, the word "pixel" is used to refer to an element of this block of levels by analogy.

A second syntax element called "Level" is defined for the transmission of the value of a level in the first mode. The third syntax element, called "Run" is used to encode a repetition value. Considering that the predictor block is scanned from the top left corner to the bottom right corner, row by row from left to right and top to bottom (i.e. the raster scan order), the Run syntax element gives the number of successive pixels in the predictor block having the same encoding. If the Pred mode is 0, this is the number of successive pixels of the predictor block having the same level value. If the Pred mode is 1, this is the number of successive pixels of the predictor block having a level value corresponding to the level value of the above pixel.

SUMMARY OF THE INVENTION

The present invention has been devised to improve the coding efficiency of the palette mode.

According to a first aspect of the present invention, there is provided a method for inferring values of encoding parameters used in the encoding of indexes of a block of indexes used for encoding a coding unit according to a palette coding mode, said indexes belonging to a palette comprising a set of indexes associated to pixel values, the indexes of blocks of indexes being encoded according to a given order of encoding, wherein an encoding parameter representative of a mode of prediction associated to a current index of a block of indexes is inferred if the current index is located in a first row of the block of indexes as a mode of prediction other than above.

According to a second aspect of the present invention, there is provided a method for inferring values of encoding parameters used in the encoding of indexes of a block of indexes used for encoding a coding unit according to a palette coding mode, said indexes belonging to a palette comprising a set of indexes associated to pixel values, the indexes of blocks of indexes being encoded according to a given order of encoding, wherein if the current index follows a previous index in encoding order having an associated encoding parameter representative of a mode of prediction equal to above, an encoding parameter representative of a mode of prediction associated to a current index of the block of indexes is inferred as being a mode of prediction other than a mode of prediction equal to above.

In an embodiment, the mode of prediction other than a mode of prediction equal to above is a mode of prediction equal to left.

According to a third aspect of the present invention, there is provided a method for inferring values of encoding parameters used in the encoding of indexes of a block of indexes used for encoding a coding unit according to a palette coding mode, said indexes belonging to a palette comprising a set of indexes associated to pixel values, the indexes of blocks of indexes being encoded according to a given order of encoding, wherein when a current index follows a previous index according to the given order of encoding the value of the current index is inferred in a dependence on the prediction mode associated with said previous index In an embodiment, if the current index follows a previous index in encoding order having an associated mode of prediction, the value of the current index is inferred from a list of index values not including the value of the index according to the mode of prediction associated with the previous index when applied to the current index.

In an embodiment, if the current index follows a previous index in encoding order having an associated mode of prediction equal to left, the value of the current index is inferred from a list of values not comprising the value of the index on the left of the current index.

In an embodiment, if the current index follows a previous index in encoding order having an associated mode of prediction representative of a direction of prediction equal to above, the value of the current index is inferred from a list of values not comprising the value of the index above the current index.

In an embodiment, if the current index follows a previous index in encoding order having an associated mode of prediction representative of a direction of prediction equal to above, a mode of prediction equal to left is an encoding parameter of the current index.

According to a fourth aspect of the present invention, there is provided a method for encoding or decoding a coding unit comprising inferring values of encoding parameters used in the encoding of indexes of a block of indexes used for encoding a coding unit according to a palette coding mode, said indexes belonging to a palette comprising a set of indexes associated to pixel values, the indexes of blocks of indexes being encoded according to a given order of encoding, wherein if a current index follows a previous index according to the given order of encoding the value of the current index is inferred from a list of index values not comprising a value of the index according to the mode of prediction associated with the previous index and the length of a word representing the value of the current index is modified according to the value of an integer R, such as $M=2^N-R$, where M is the number of values in said list of values and N is a number of bits representing the length of the word representing the value of the current index.

In an embodiment, if the current index follows a previous index in encoding order having an associated mode of prediction equal to left, the value of the current index is inferred from a list of values not comprising the value of the index on the left of the current index.

In an embodiment, if the current index follows a previous index in encoding order having an associated mode of prediction representative of a direction of prediction equal to above, the value of the current index is inferred from a list of values not comprising the value of the index above the current index.

According to a fifth aspect of the present invention, there is provided a method for encoding a coding unit comprising the method of inferring values of encoding parameters according to the first to third aspects.

According to a sixth aspect of the present invention, there is provided a method for decoding a coding unit comprising the method of inferring values of encoding parameters according to any of the first to third aspects.

According to seventh aspect of the present invention, there is provided apparatus for determining encoding parameters comprising means for performing the method of any of the first to third aspects.

According to an eighth aspect of the present invention, there is provided apparatus for encoding a coding unit in a bitstream comprising means for performing the respective encoding method of any of the fourth or fifth aspects.

According to a ninth aspect of the present invention, there is provided apparatus for decoding a coding unit from a bitstream comprising means for performing the respective decoding method of any of the fourth or sixth aspects.

According to a tenth aspect there is provided a computer program comprising executable instructions which upon execution by a programmable apparatus cause the apparatus to perform the method of any of the first to sixth aspects.

According to an eleventh aspect of the present invention, there is provided a non-transitory computer readable carrier medium which, when run on a computer or processor, causes the computer or processor to carry out a method of any of the first to sixth aspects.

According to a twelfth aspect, the invention provides a method for inferring values of encoding parameters used in the encoding of indexes of a block of indexes used for encoding a coding unit according to a palette coding mode, said indexes belonging to a palette comprising a set of indexes associated to pixel values, the palette coding mode comprising building a predictor block from the block of indexes to predict a current coding unit, the indexes of blocks of indexes being encoded according to a given order of encoding, wherein a parameter associated to a current pixel of a block of pixels is inferred in function of context information depending on the order of encoding pixels.

In an embodiment a first parameter is representative of a mode of prediction of a current index of the block of indexes.

In an embodiment said first parameter is inferred if the current index is in first position in a column of indexes of the block of indexes.

In an embodiment said first parameter is inferred if the current index follows a previous index in encoding order having an associated first parameter representative of a mode of prediction equal to above.

In an embodiment a second parameter is representative of a value of the current index In an embodiment if the current index follows a previous index in encoding order having an associated first parameter representative of a mode of prediction equal to left, the second parameter of the current index is inferred from a list of values not comprising the value of the index on the left of the current index.

In another embodiment, if the current index follows a previous index in encoding order having an associated first parameter representative of a mode of prediction equal to left and having an associated second parameter satisfying a predetermined criterion, the second parameter of the current index is inferred from a list of values not comprising the value of the index on the left of the current index.

In an embodiment, said associated second parameter satisfies the predetermined criterion when it is being lower than a predetermined value.

In an embodiment if the current index follows a previous index in encoding order having an associated first parameter representative of a direction of prediction equal to above, the second parameter of the current index is inferred from a list of values not comprising the value of the index above the current index.

In an embodiment, if said list of values for inferring the second parameter of the current index does not comprise the value of the index on the left of or above the current index or/and a predetermined value, then the length of a word representing the second parameter is adjusted according to a predetermined criterion. The length of the word is superior or equal to zero.

In an embodiment, if said list of values for inferring the second parameter of the current index does not comprise at least one predetermined value, then the length of a word representing the second parameter is adjusted according to a predetermined criterion.

In an embodiment, the length of the word representing the second parameter is adjusted according to the number of values in said list of values.

In an embodiment, the length of the word representing the second parameter is adjusted according to the value of an integer R, such as M=2N−R, where M is the number of values in said list of values and N is a number of bits representing the length of the word representing the second parameter.

In other words, in these last embodiments, if the current index follows a previous index (in encoding order) having an associated first parameter representative of a mode of prediction equal to respectively left or up (or in any other predetermined situations as defined below), the second parameter of the current index is inferred from a list of values not comprising the value of the index on respectively the left of or above the current index, referred to as "sparse list" from now on. In such an embodiment, this can be exploited to reduce the actual range of index to code: the maximum number of possible values can be decremented, and if the index is above the missing index, then its value can be decremented as well. This can be combined with an efficient coding method for the index: for a number M of elements such that $M=2_N-R$ with $N\geq 0$ and $0<R\leq 2^N$ integers, instead of coding the index on N bits as would be the simplest, the following happens:

If the index of value "val" is below R, then it is coded on N−1 bits as is;

Otherwise, val+R is coded on N bits.

According to a thirteenth aspect, the invention provides a method for encoding or decoding a coding unit comprising the method of inferring values of encoding parameters used in the encoding of indexes of a block of indexes used for encoding a coding unit according to a palette coding mode according to the twelfth aspect.

In a fourteenth aspect, the invention provides a device for encoding or decoding a coding unit comprising a module adapted to implement the method of inferring values of encoding parameters used in the encoding of indexes of a block of indexes used for encoding a coding unit according to a palette coding mode according to the twelfth aspect.

In a fifteenth aspect there is provided a method of encoding or decoding a coding unit comprising the method for inferring values of encoding parameters according to the twelfth aspect. Decoding of a video bitstream comprising an encoded sequence of digital images may comprise said decoding of a coding unit and encoding of a sequence of digital images into a bitstream may comprise said encoding of a coding unit.

In a sixteenth aspect there is provided an apparatus for inferring values of encoding parameters used in the encoding of indexes of a block of indexes used for encoding a coding unit according to a palette coding mode comprising means for performing the method according to the twelfth aspect.

In a seventeenth aspect there is provided apparatus for encoding or decoding a coding unit comprising means for performing the respective encoding or decoding method of the fifteenth aspect.

In an eighteenth aspect, the invention provides non-transitory computer-readable medium storing a program which, when executed by one or more microprocessors or a computer causes the processor(s) or computer to perform the method of any of the twelfth, thirteenth and fifteenth aspects.

In a nineteenth aspect the invention provides an information storage means readable by a computer or a microprocessor storing instructions of a computer program, wherein it makes it possible to implement the method of any of the twelfth, thirteenth and fifteenth aspects.

In a twentieth aspect the invention provides a computer program comprising executable instructions which upon execution by a programmable apparatus cause the apparatus to perform the method of any of the twelfth, thirteenth and fifteenth aspects.

According to a twenty-first aspect of the invention, there is provided a method for determining values of encoding parameters used for encoding indexes from a block of indexes for processing a coding unit according to a palette mode using a palette, each index being related to one of the pixels forming the coding unit, the palette comprising a set of indexes associated to pixel values, the processing comprising obtaining a coding unit predictor from the block of indexes and the palette to predict the corresponding coding unit. The method comprises:

determining one or more encoding parameters for an index associated with one of the pixel of the coding unit according to the spatial neighbourhood of said pixel and having regard to the encoding order of the pixels forming the coding unit.

For instance, the spatial neighbourhood comprises the pixel located above a considered pixel.

In an embodiment, a first encoding parameter determined represents a mode of prediction of an index of the block of indexes.

In an embodiment, a first encoding parameter is deduced if the location of the current index is the first line of indexes of the block of indexes.

In an embodiment, said first parameter is deduced if the current index follows a previous index in processing order having an associated first parameter representative of a mode of prediction equal to above.

In an embodiment, a second encoding parameter determined is representative of a value of the current index.

In an embodiment, if the current index follows a previous index in processing order having an associated first parameter representative of a mode of prediction equal to left, the second parameter of the current index is determined from a list of index values not comprising the value of the index on the left of the current index.

In an embodiment, if the current index follows a previous index in encoding order having an associated first parameter representative of a mode of prediction equal to left and having an associated second parameter satisfying a predetermined condition, the second parameter of the current index value is determined from a list of values not comprising the value of the index on the left of the current index.

In an embodiment, the predetermined condition is that the associated second parameter is less than a predetermined index value.

In an embodiment, if the current index follows a previous index in processing order having an associated first parameter representative of a direction of prediction equal to above, the second parameter of the current index is determined from a list of index values not comprising the value of the index above the current index.

In an embodiment, if an index follows an index having an associated first encoding parameter representative of a first mode of prediction representative of a direction of prediction equal to left, the second encoding parameter of the index is determined from a list of index values having a number of index values less than or equal to the size of the palette minus one.

In an embodiment, the first mode of prediction is one of a plurality of available modes of prediction and the index values of said list depends on the plurality of modes of prediction.

In an embodiment, index values referring to the values of the indexes able to be predicted with modes of prediction other than the first mode of prediction are not included in said list.

In an embodiment, the list of index values has a number of index values less than or equal to the size of the palette minus two.

In an embodiment, if the number of indexes predicted with modes of prediction other than the first mode of prediction is greater than one, not including the lowest index value among the values of the indexes able to be predicted with the other modes of prediction, so that the list of index values has the size equal to size of the palette minus one.

In an embodiment, one of the plurality of available modes of prediction is a transition mode, where the encoding parameter is determined from a table storing patterns, patterns being constituted by the indexes of at least one neighbour of an index of the block of indexes, said pattern being associated with at least one prediction index corresponding to an index expected at a location in the neighbourhood of the pattern.

According to a twenty-second aspect of the invention, it is proposed a method of encoding a coding unit comprising determining values of encoding parameters according to the method mentioned above. The values of encoding parameters are used for obtaining indexes from a block of indexes for encoding the coding unit, said coding unit predictor being generating from the block of indexes and the palette.

According to a twenty-third aspect of the invention, it is proposed a method of decoding a coding unit from a bitstream, comprising obtaining values of encoding parameters, said values of encoding parameters having been determined with the method mentioned above. The values of encoding parameters are used for obtaining indexes from a block of indexes for decoding the coding unit, said coding unit predictor being obtained from the block of indexes and the palette extracted from the bitstream.

In an embodiment a step for modifying the length of the word representing the second encoding parameter according to the number of values in said list of values comprises modifying the length of the word according to the value of an integer R, such as $M=2N-R$, where M is the number of values in said list of values and N is a number of bits representing the length of the word representing the second parameter.

According to a twenty-fourth aspect of the invention, it is proposed an apparatus for determining values of encoding parameters comprising means for performing the method of any of claims mentioned above.

According to a twenty-fifth aspect of the invention, it is proposed an apparatus for encoding or decoding a coding unit comprising means for performing the respective encoding or decoding methods mentioned above.

According to a twenty-sixth aspect of the invention, it is proposed a computer program comprising executable instructions which upon execution by a programmable apparatus cause the apparatus to perform the method mentioned above.

According to a twenty-seventh aspect of the invention, it is proposed a non-transitory computer readable carrier medium which, when run on a computer or processor, causes the computer or processor to carry out a method mentioned above.

According to a twenty-eighth aspect of the invention, it is proposed a method for determining encoding parameters for encoding indexes of a block of indexes used for encoding a coding unit of an image according to a palette, each index being related to one of the pixels forming the coding unit, the palette comprising a set of indexes associated to pixel values. The method comprises:
  generating each index of the block of indexes related to the coding unit from the palette based on corresponding encoding parameters, and
  if indexes of the block of indexes cannot be generated from the palette for at least one pixels of the coding unit, generating index values corresponding to escape values for replacing said indexes of the block of indexes which cannot be generated; and
  determining one or more encoding parameters corresponding to an index according to the spatial neighbourhood of said pixel and having regard to the encoding order of the pixels of the coding unit.

For instance, the spatial neighbourhood comprises the pixel located above a considered pixel.

In an embodiment a first encoding parameter represents a mode of prediction of an index of the block of indexes.

In an embodiment, said first encoding parameter is deduced if the location of the current index is the line of indexes of the block of indexes.

In an embodiment, said first encoding parameter is deduced if the current index follows a previous index in encoding order having an associated first parameter representative of a mode of prediction equal to above.

In an embodiment, a second encoding parameter determined is representative of a value of the generated index of the block of indexes.

In an embodiment, if the generated index follows a previous index in encoding order having an associated first parameter representative of a mode of prediction equal to left, the second parameter of the current index is determined from a list of index values not comprising the value of the index on the left of the current index.

In an embodiment, if the current index follows a previous index in encoding order having an associated first parameter representative of a mode of prediction equal to left and having an associated second parameter satisfying a predetermined condition, the second parameter of the current index value is determined from a list of values not comprising the value of the index on the left of the current index.

In an embodiment, the predetermined condition is that the associated second parameter is less than a predetermined index value.

In an embodiment, if the current index follows a previous index in encoding order having an associated first parameter representative of a direction of prediction equal to above, the second parameter of the current index is determined from a list of index values not comprising the value of the index above the current index.

In an embodiment, if an index follows an index having an associated first encoding parameter representative of a first mode of prediction representative of a direction of prediction equal to left, the second encoding parameter of the index is determined from a list of index values having a number of index values less than or equal to the size of the palette minus one.

In an embodiment, the first mode of prediction is one of a plurality of available modes of prediction and the index values of said list depends on the plurality of modes of prediction.

In an embodiment, index values referring to the values of the indexes able to be predicted with modes of prediction other than the first mode of prediction are not included in said list.

In an embodiment, the list of index values has a number of index values less than or equal to the size of the palette minus two.

In an embodiment, if the number of indexes predicted with modes of prediction other than the first mode of prediction is greater than one, not including the lowest index value among the values of the indexes able to be predicted with the other modes of prediction, so that the list of index values has the size equal to size of the palette minus one.

In an embodiment, one of the plurality of available modes of prediction is a transition mode, where the encoding parameter is determined from a table storing patterns, patterns being constituted by the indexes of at least one neighbour of an index of the block of indexes, said pattern being associated with at least one prediction index corresponding to an index expected at a location in the neighbourhood of the pattern.

According to a twenty-ninth aspect of the invention, it is proposed a method of encoding a coding unit comprising determining values of encoding parameters according to the method mentioned above.

According to a thirtieth aspect of the invention, it is proposed a method for decoding indexes of a block of indexes used for decoding a coding unit of an image according to a palette obtained from a bitstream, each index being related to one of the pixels forming the coding unit, the palette comprising a set of indexes associated to pixel values. The method comprises:
  obtaining the palette from the bitstream and generating the block of indexes from the bitstream and the obtained palette according to encoding parameters,
  obtaining from the bitstream if available, index values corresponding to escape values for replacing said indexes of the block of indexes which cannot be generated from the palette; and
  determining the encoding parameters corresponding to an index according to the spatial neighbourhood of said pixel having regard to an encoding order of the pixels forming the coding unit.

In an embodiment, the encoding parameters are determined having regard to an encoding order when encoding the coding unit with a method mentioned above.

In an embodiment, a step for modifying the length of the word representing the second encoding parameter according to the number of values in said list of values comprises modifying the length of the word according to the value of an integer R, such as $M=2N-R$, where M is the number of values in said list of values and N is a number of bits representing the length of the word representing the second parameter.

According to a thirty-first aspect of the invention, it is proposed an apparatus for determining encoding parameters comprising means for performing the method mentioned above.

According to a thirty-second aspect of the invention, it is proposed an apparatus for encoding a coding unit comprising means for performing the respective encoding method mentioned above.

According to a thirty-third aspect of the invention, it is proposed an apparatus for decoding a coding unit comprising means for performing the respective decoding method mentioned above.

According to a thirty-fourth aspect of the invention, it is proposed a computer program comprising executable instructions which upon execution by a programmable apparatus cause the apparatus to perform the method mentioned above.

According to a thirty-fifth aspect of the invention, it is proposed a non-transitory computer readable carrier medium which, when run on a computer or processor, causes the computer or processor to carry out a method mentioned above.

According to a thirty-sixth aspect, the invention provides a method for inferring values of encoding parameters used in the encoding of indexes of a block of indexes used for encoding a coding unit according to a palette coding mode, said indexes belonging to a palette comprising a set of indexes associated to pixel values, the palette coding mode comprising building a predictor block from the block of indexes to predict a current coding unit, the indexes of blocks of indexes being encoded according to a given order of encoding, wherein a parameter associated to a current pixel of a block of pixels is inferred in function of context information depending on the order of encoding pixels.

In an embodiment, a first parameter is representative of a mode of prediction of a current index of the block of indexes.

In an embodiment, said first parameter is inferred if the current index is in first position in a column of indexes of the block of indexes.

In an embodiment, said first parameter is inferred if the current index follows a previous index in encoding order having an associated first parameter representative of a mode of prediction equal to above.

In an embodiment, a second parameter is representative of a value of the current index In an embodiment, if the current index follows a previous index in encoding order having an associated first parameter representative of a mode of prediction equal to left, the second parameter of the current index is inferred from a list of values not comprising the value of the index on the left of the current index.

In an embodiment, if the current index follows a previous index in encoding order having an associated first parameter representative of a direction of prediction equal to above, the second parameter of the current index is inferred from a list of values not comprising the value of the index above the current index.

In a thirty-seventh aspect, the present invention provides a method for encoding or decoding a coding unit comprising the method of inferring values of encoding parameters used in the encoding of indexes of a block of indexes used for encoding a coding unit according to a palette coding mode according to the thirty-sixth aspect.

In a thirty-eighth aspect, the present invention provides a device for encoding or decoding a coding unit comprising a module adapted to implement the method of inferring values of encoding parameters used in the encoding of indexes of a block of indexes used for encoding a coding unit according to a palette coding mode according to the thirty-sixth aspect.

In a thirty-ninth aspect, the present invention provides non-transitory computer-readable medium storing a program which, when executed by a microprocessor or computer in an encoding or decoding device causes the device to perform the method of the thirty-sixth and thirty-seventh aspect.

In a fortieth aspect, the present invention provides an information storage means readable by a computer or a microprocessor storing instructions of a computer program, wherein it makes it possible to implement the method of the thirty-sixth and thirty-seventh aspect.

According to a forty-first aspect the present invention provides a method for encoding or decoding a current block of pixels of an image according to a palette mode, the palette mode using a color palette comprising a set of values to represent at least one component of pixels of the current block, the method comprising obtaining a color palette predictor and predicting the color palette of the current block using the color palette predictor. As will be appreciated, the palette mode of the forty-first aspect may be applied in performing any of the aspects already described above.

In an embodiment, blocks of said image are ordered according to a predefined scanning order and the color palette predictor is determined from the color palette of the last block encoded according to the palette mode in a given causal area of the image.

In an embodiment, values of the current color palette are predicted from values comprised in the color palette predictor.

In an embodiment, values of color palettes are ordered and wherein a value of the current color palette is associated to a flag indicating whether said value is predicted from the value having the same order in the color palette predictor.

In an embodiment, the given causal area is the part already reconstructed of an encoding entity comprising the current block of pixels.

In an embodiment, values of color palettes are ordered and wherein a value of the current palette is associated to a flag indicating whether said value is predicted from the value having a given order in the color palette predictor.

In an embodiment, a color palette predictor is associated to each encoding entity of the image.

In an embodiment, the color palette predictor is obtained from pixels neighboring the current block.

According to a forty-second aspect of the present invention, there is provided a method for inferring values of encoding parameters used in the encoding of indexes of a block of indexes used for encoding a coding unit according to a palette coding mode, said indexes belonging to a palette comprising a set of indexes associated to pixel values, the indexes of blocks of indexes being encoded according to a given order of encoding, wherein when a current index follows a previous index according to the given order of encoding having an associated mode of prediction representative of a direction of prediction equal to above, the value of the current index is inferred from a list of values not comprising the value of the index above the current index.

In an embodiment a mode of prediction equal to left is used to encode the current index.

At least part of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a USB key, a memory card, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 8a illustrates an example of the palette and block/CU of levels derivation in relation to FIG. 7a;

FIG. 9 illustrates an example of the syntax palette element generated;

DETAILED DESCRIPTION OF THE EMBODIMENTS

Figure 1:
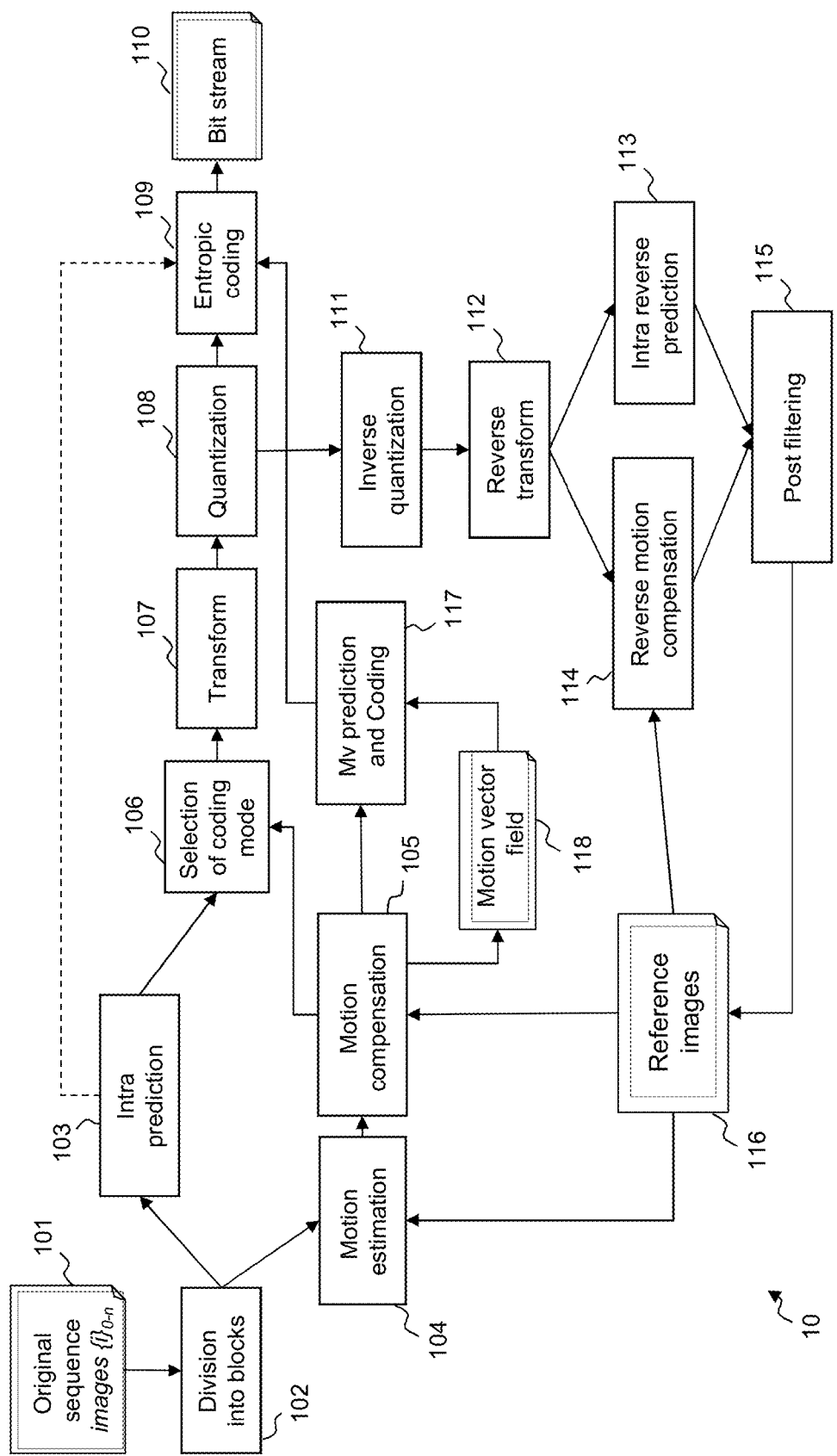
FIG. 1 illustrates the architecture of a video encoder.
Figure 2:
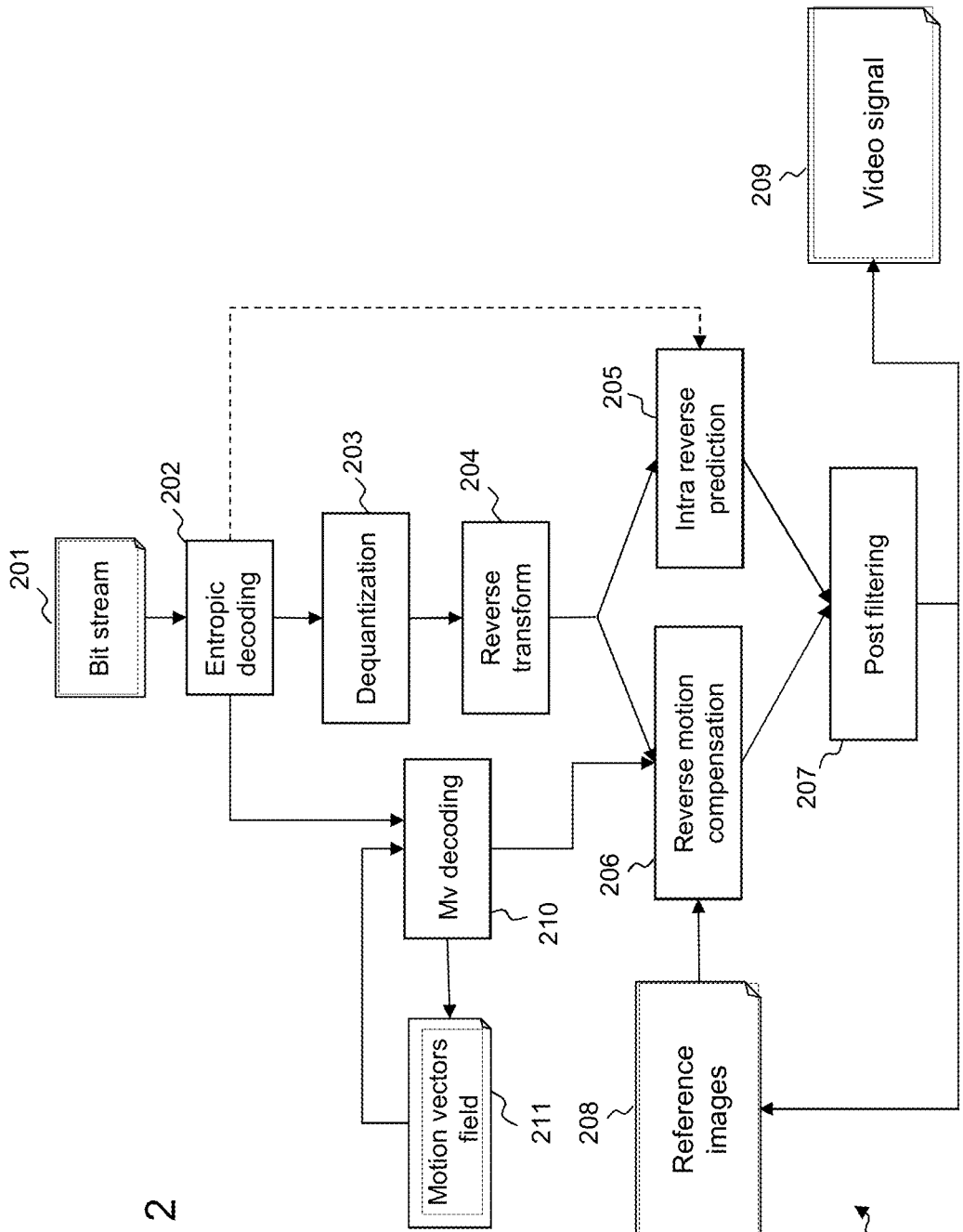
FIG. 2 illustrates the architecture of a video decoder.

One general principle of video compression standards is to benefit from spatial and temporal redundancies to reduce the video bitrate. In FIGS. 1 and 2, we have respectively represented the different steps performed in an video encoder and in a video decoder.

FIG. 1 represents the architecture of an HEVC encoder (10). In the video sequence encoder, the original sequence (101) is divided into blocks of pixels (102). A coding mode is then affected to each block. There are two families of coding modes: the modes based on spatial prediction (INTRA) (103) and the modes based on temporal prediction (INTER, Bidir, Skip) (104, 105). An INTRA block is generally predicted from the encoded pixels at its causal boundary by a process called INTRA prediction.

Temporal prediction first consists in finding in a previous or future frame (i.e. a reference frame (116)) the reference area which is the closest to the block to encode (motion estimation (104)) and secondly in predicting this block using the selected area (motion compensation (105)).

In both cases (spatial and temporal prediction), a residual is computed by subtracting the prediction from the original predicted block.

In the INTRA prediction, a prediction direction is encoded. In the temporal prediction, at least one motion vector is encoded. However, in order to further reduce the bitrate cost related to motion vector encoding, a motion vector is not directly encoded. Indeed, assuming that motion is homogeneous, it is particularly interesting to encode a motion vector as a difference between this motion vector, and a motion vector in its neighborhood (e.g. a motion vector of a neighboring or surrounding block). In H.264 for instance, motion vectors are encoded with respect to a median vector computed between 3 blocks located above and on the left of the current block. Only a difference (also called residual motion vector) computed between the median vector and the current block motion vector is encoded in the bitstream. This is process is performed by the module 'Mv prediction and coding' (117). The value of each encoded vector is stored in a motion vector field (118). The neighboring motion vectors, used for the prediction, are extracted from the motion vector field (118). For HEVC, the motion vector coding process is slightly different and detailed in the following sections.

Then, the mode optimizing the rate distortion performance is selected (106). In order to further reduce the redundancies, a transform (DCT) is applied to the residual block (107), and a quantization is applied to the coefficients (108). The quantized block of coefficients is then entropy coded (109) and the result is inserted in the bitstream (110). The encoder then performs a decoding of the encoded frame for the future motion estimation (111 to 116). These steps allow the encoder and the decoder to have the same reference frames.

To reconstruct the coded frame, the residual is inverse quantized (111) and inverse transformed (112) in order to provide the "decoded" residual in the pixel domain. According to the encoding mode (INTER or INTRA), this residual is added to the INTER predictor (114) or to the INTRA predictor (113).

Then, this first reconstruction of the frame is filtered (115) by one or several kinds of post filtering. These post filters are integrated in the encoder and decoder loop. It means that they need to be applied on the reconstructed frame at encoder and decoder side in order to use the same reference frame at encoder and decoder side. The aim of this post filtering is to remove compression artifacts. For example, H.264/AVC uses a deblocking filter. This filter can remove blocking artifacts due to the DCT quantization of residual and to block motion compensation. In the current HEVC standard, 3 types of loop filters are used: deblocking filter, sample adaptive offset (SAO) and adaptive loop filter (ALF). These loop filters are described in a following section.

FIG. 2 represents the architecture of an HEVC decoder (20). In FIG. 2, we have represented the principle of a decoder. The video stream (201) is first entropy decoded (202). The residual data are then inverse quantized (203) and inverse transformed (204) to obtain pixel values. The mode data are also entropy decoded and in function of the mode, an INTRA type decoding or an INTER type decoding is performed. In the case of INTRA mode, an INTRA predictor is determined in function of the Intra prediction mode specified in the bitstream (205). If the mode is INTER, the motion information is extracted from the bitstream (202). This is composed of a reference frame index (208) and a motion vector residual. The motion vector predictor is added to the motion vector residual to obtain the motion vector (210). The motion vector is then used to locate the reference area in the reference frame (206). Note that the motion vector data or motion vector field (211) is updated with the decoded motion vector in order to be used for the prediction of the next decoded motion vectors. This first reconstruction of the decoded frame is then post filtered (207) with exactly the same post filter as used at encoder side. The output of the decoder is the un-compressed video (209).

Figure 3:
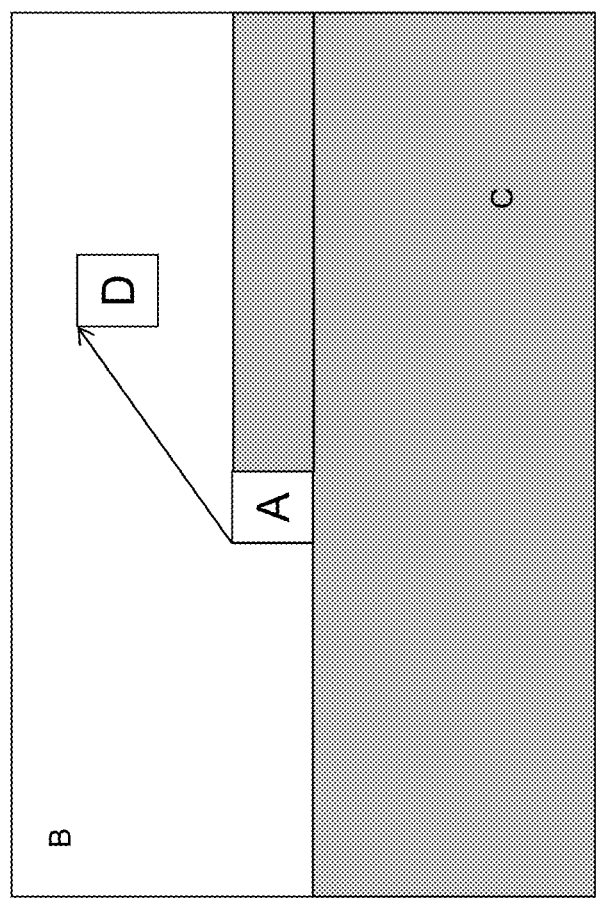
FIG. 3 illustrates the concept of the causal area.

FIG. 3 illustrates the causal concept in a video encoder or video decoder. When encoding index A, all of part of B can be used to improve the coding efficiency for A. C cannot be accessed.

Figure 4:
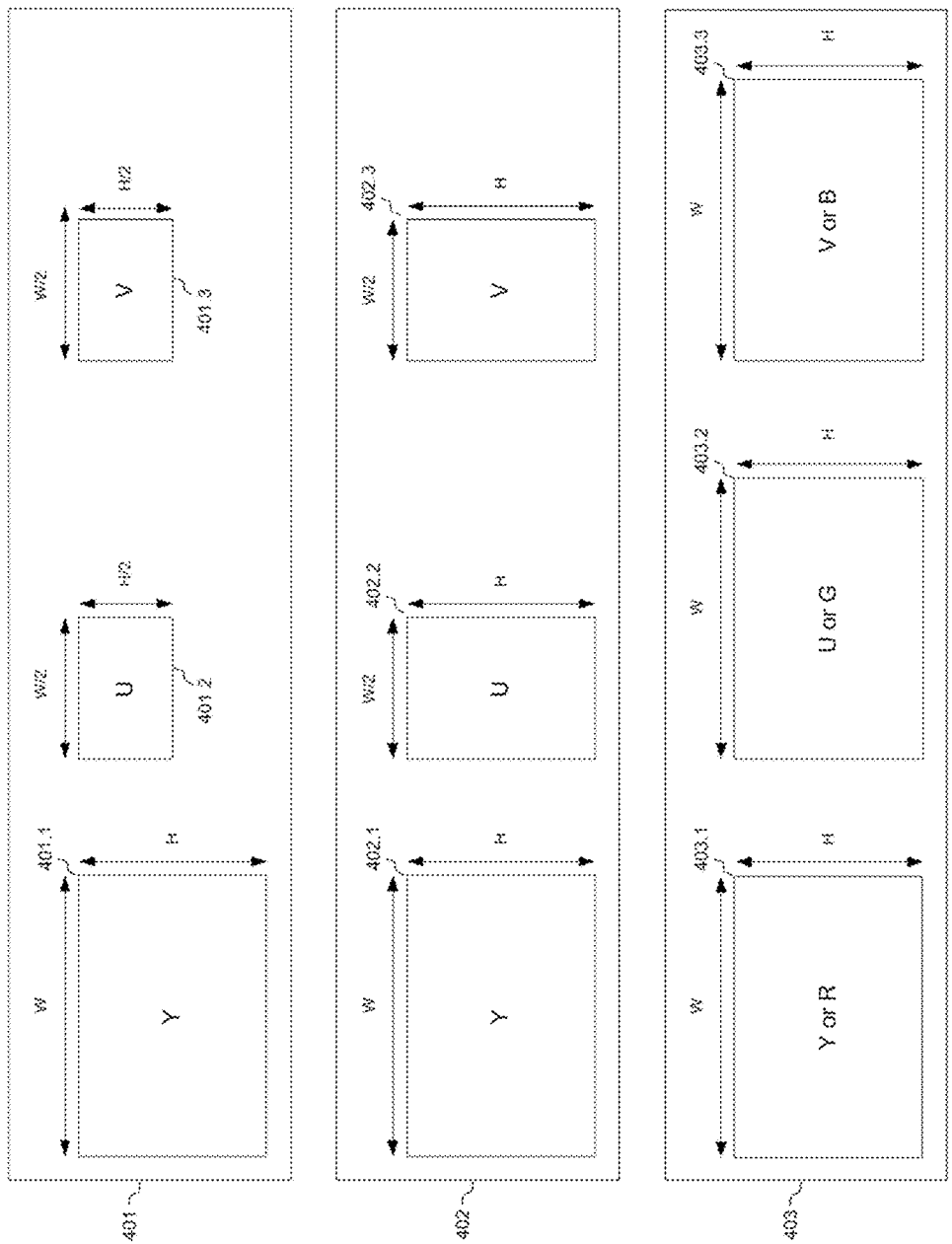
FIG. 4 illustrates Chroma format supported in HEVC Range Extension.

FIG. 4 illustrates the new video format that the future HEVC Range Extension will support. The HEVC Range Extension, also commonly called HEVC RExt, is an extension under definition of the new video coding standard HEVC. The aim of this extension is to provide additional tools to code video sequences with additional color formats and bit-depth. More specifically, this extension will support 4:2:2 video color format as well as 4:4:4 video color format. If the current HEVC standard is able to deal with 4:2:0 color format with 8 and 10 bits per color sample, the HEVC Range Extension should additionally support 4:2:2 and 4:4:4 video format with an extended bit depth ranging from 8 bits up to 14 bits.

A color picture is generally made of 3 color components R, G and B. These components are generally correlated, and it is very common in image and video compression to de-correlate the color components prior to processing the pictures. The most common format is the YUV color format. YUV signals are typically created from RGB pictures, by using a linear transform to the 3 inputs R, G and B input pictures. Y is usually called Luma component, U and V are generally called Chroma components. The term 'YCbCr' is also commonly used in place of the term 'YUV'.

It is very common to apply different sampling ratios to the three color components. The subsampling scheme is commonly expressed as a three part ratio J:a:b (e.g. 4:2:2), that describe the number of luminance and chrominance samples in a conceptual region that is J pixels wide, and 2 pixels high. The parts are (in their respective order):

J: horizontal sampling reference (width of the conceptual region). Usually, 4.

a: number of chrominance samples (Cr, Cb) in the first row of J pixels.

b: number of (additional) chrominance samples (Cr, Cb) in the second row of J pixels.

FIG. 4 illustrates the different considered Chroma formats in HEVC RExt. These formats are different due to a different picture size of the three color components, and to a different type of the color components.

In the 4:2:0 YUV Chroma format, illustrated in (401), the pictures are made of 3 color components: Y (401.1), U (401.2) also noted Cr, and V (401.3) also noted Cb. If the Y component picture is of width W pixels and of height H pixels, the U and V components pictures are of width W/2 pixels and of height H/2 pixels.

In the 4:2:2 YUV Chroma format, illustrated in (402), the pictures are made of 3 color components: Y (402.1), U (402.2) also noted Cr, and V (402.3) also noted Cb. If the Y component picture is of width W pixels and of height H pixels, the U and V components pictures are of width W/2 pixels and of height H pixels.

In the 4:4:4 YUV Chroma format, illustrated in (403), the pictures are made of 3 color components: Y (403.1), U (403.2) also noted Cr, and V (403.3) also noted Cb. The three components are of same width W and height H.

In the 4:4:4 RGB Chroma format, illustrated in (403), the pictures are made of 3 color components: R (403.1), G (403.2), and B (403.3). The three components are of same width W and height H.

When a picture is monochrome, its format is named 4:0:0.

The bit-depth of input samples is the number of bits related to each pixel for each color component. The HEVC version 1 is defined for 8 bits input sample for 4:2:0 format. When the input samples are represented with 8 bits, each sample can take $2^8=256$ values. For some applications, it is useful to extend the bit-depth of input sample in order to have a larger dynamic of samples. Generally, the aim is to increase the visual quality of the video. The known bit-depths are 8, 10, 12, 14 or 16 bits. The Range Extension (RExt) of HEVC is dedicated to this larger dynamics in addition to the extended color format.

Moreover the Range Extension (RExt) of HEVC is able to encode losslessly the input sequences. The goal of a lossless codec (as opposed to a lossy one) is to have a decoded output strictly identical to the input. To achieve this, a number of things must be modified or added, compared to a lossy codec. Here is a non-exhaustive list of specific things required for HEVC to work losslessly:

Removal of the quantization (main source of errors);

Forced activation of the bypass transform, as normal cosine/sine transforms may introduce errors (in addition to no longer be suited for lossless coding);

Removal of tools specifically tailored at compensating quantization noise, such as DBF and SAO.

Moreover, additional tools specific to Range Extension (RExt) of HEVC have been added or are under consideration to efficiently encode "screen content" video sequences in addition to natural sequences. The "screen content" sequences refer to particular sequences which have a very specific content. The "screen content" video sequences are related to video sequences corresponding to those captured from a personal computer of any other device containing for example text, a presentation in the form of slides, a Graphical User Interface, a table. These particular sequences have quite different statistics compared to natural video sequences. In video coding, performance of traditional video coding tools is sometimes inefficient for this specific video content.

The current tools under consideration are the 'Infra Block Copy' mode and the 'Color Palette' mode. They have demonstrated a good efficiency over the traditional method targeting natural video sequences. The Color Palette mode is the tool that we are considering in the scope of this invention in order to further improve the coding efficiency of the HEVC Range Extension when targeting screen content video sequences.

Figure 5:
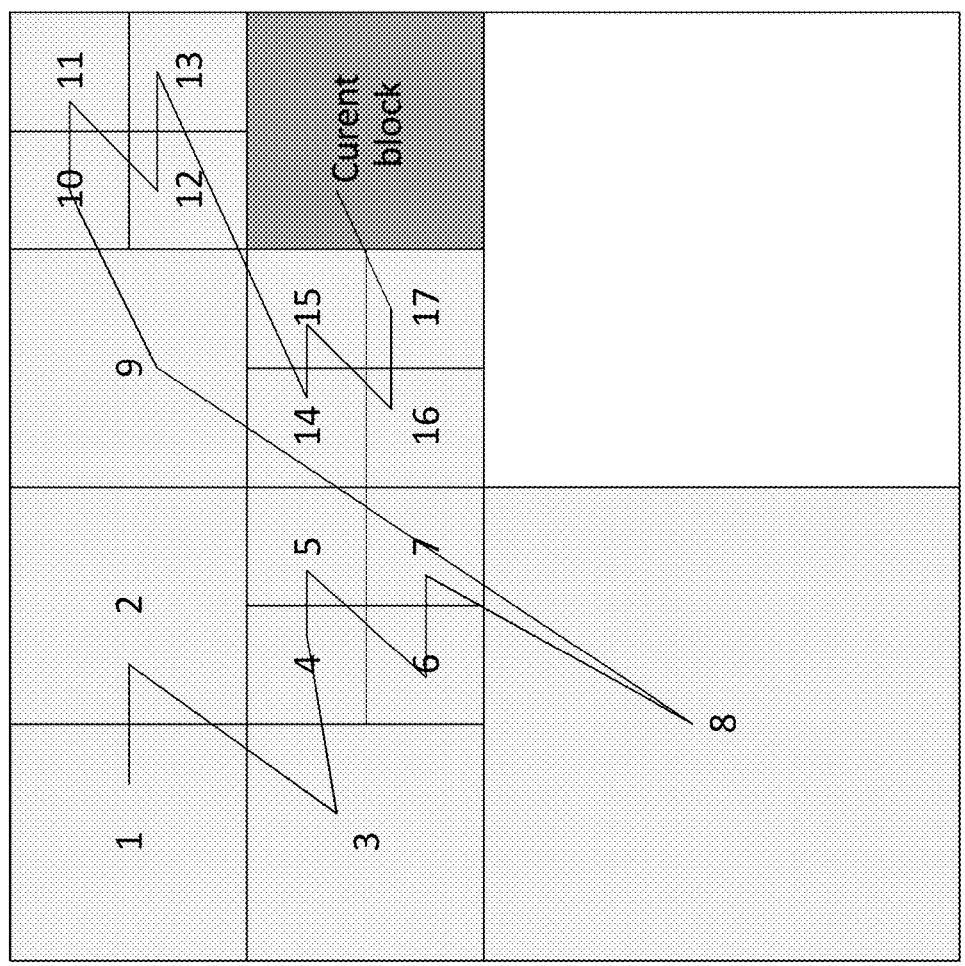
FIG. 5 illustrates the CTB splitting in CUs and the scan order decoding of these CU.

FIG. 5 illustrates the Coding Tree Block splitting in Coding Units and the scan order decoding of these Coding Units. In the HEVC standard, the block structure is organized by Coding Tree Block (CTB). A frame contains several non-overlapped and square Coding Tree Blocks. The size of a Coding Tree Block can vary from 64×64 to 16×16. This size is determined at sequence level. The most efficient size, in term of coding efficiency, is the largest one: 64×64. Please note that all Coding Tree Blocks have the same size except for the image border. In that case, the size is adapted according to the amount of pixels.

Figure 6:
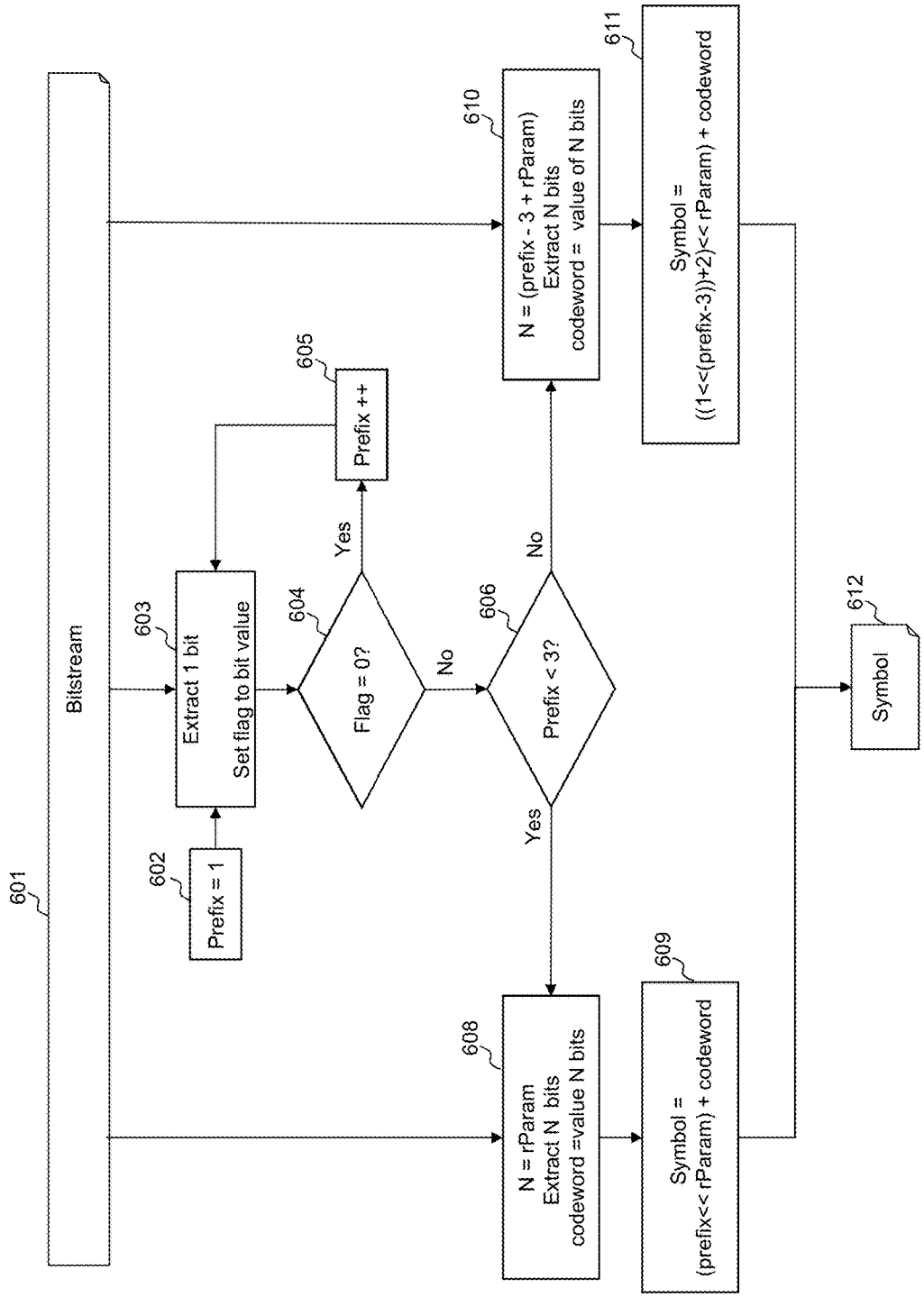
FIG. 6 illustrates the decoding process for the coeff_abs_level_remaining of HEVC.

Each Coding Tree Block contains one or more square Coding Units (CU). The Coding Tree Block is split based on a quad-tree structure into several Coding Units. The coding or decoding order of each Coding Unit in the Coding Tree Block follows the quad-tree structure based on a raster scan order. FIG. 5 shows an example of the decoding order of Coding Units. In this figure, the number in each Coding Unit gives the decoding order of each Coding Unit of this Coding Tree Block FIG. 6 shows an HEVC Syntax coding. In the HEVC standard or in the HEVC RExt, several methods are used to code the different syntax elements. HEVC uses several types of entropy coding like the Context based Adaptive Binary Arithmetic Coding (CABAC), Golomb-rice Code, or simple binary representation called Fixed Length Coding. Most of the time a binarisation process is performed before encoding to represent the different syntax elements. This binarisation process is also very specific and depends on the different syntax element.

For example, the syntax element called "coeff_abs_level_remaining" contains the absolute value or a part of an absolute value of the coefficient residual. The idea of this specific coding is to use Golomb Rice code for the first values and Exponential Golomb for the higher values. More specifically, depending on a given parameter called Golomb parameter, this means that for representing the first values (for example from 0 to 3) a Golomb-Rice code is used, then for higher values (from 4 and above) an Exponential Golomb code is used.

FIG. 6 illustrates this principle of this specific decoding process. The input data of this process are the bitstream (601) and the rParam which is known as the Rice Golomb order or parameter. The output of this process is the decoded symbol (612).

The prefix value is set equal to 1 (602) then 1 bit is extracted from the bitstream (601) and the variable flag is set equal to the decoded value (603). If this flag is equal to 0 (604) the Prefix value is incremented (605) and another bit is extracted from the bitstream (603). When the flag value is equal to 1, the decision module (606) checks if the value Prefix is less than 3. If true, N=rParam bits are extracted (608) from the bitstream (601) and set to the variable "codeword". This codeword corresponds to the Golomb Rice representation. The Symbol value (612) is set equal to ((prefix<<rParam)+codeword) as depicted in step (609). Where << is the left shift operator.

If the Prefix is superior or equal to 3 at step (606), the next step is (610) where N=(prefix−3+rParam) bits are extracted from the bitstream and set to the variable "codeword" (610). The symbol value (611) is set equal to ((1<<(prefix−3))+2)<<rParam)+codeword. This corresponds to the Exp Golomb representation.

In the following technical note, this decoding process (or in a symmetric way the encoding process) described in that figure is called Golomb_H with a input parameter parameterParam. It can be noted in a simple way Golomb_H (Param).

In the HEVC standard and HEVC Range Extension, the Golomb parameter 'rParam' is updated according to a formula in order to adapt the entropy coding to the signal to be encoded. This formula tries to reduce the Golomb code size by increasing the Golomb order when the coefficients have large values. In the HEVC standard, the update is given by the following formula:

$$rParam=Min(cLastRiceParam+(cLastAbsLevel>(3*(1<<cLastRiceParam))?1:0),4)$$

Where cLastRiceParam is the last used rParam, cLastAbsLevel is the last decoded coeff_abs_level_remaining. Please note that for the first parameter to be encoded or decoded, cLastRiceParam and cLastAbsLevel are set equal to 0. Morever please note that the parameter rParam cannot exceed the value of 4.

For the HEVC Range Extension, this formula has been updated in order to be adapted to deal with higher bit depth and take into account very high quality required by application dealing with video compression of extended format (4:2:2 and 4:4:4) including the lossless coding. For the Range Extension, the update formula has been changed as follows:

$$rParam=Min(cLastRiceParam+(cLastAbsLevel>>(2+cLastRiceParam)),7)$$

With this formula, the maximum value of Param is 7. Moreover, for the first coding of the coeff_abs_level_remaining for a sub-block of Transform block, the Golomb parameter is set equal to:

$$rParam=Max(0,cRiceParam-(transform\_skip\_flag||cu\_transquant\_bypass\_flag?1:2))\text{ where}$$

The variable "transform_skip_flag" is set to 1 if the transform is skipped for the current CU and 0 if the transform is used The variable "cu_transquant_bypass_flag" is set to 1 if the CU is lossless encoded and 0 otherwise.

The variable "cRiceParam" is set equal to last used rParam from another sub-block of the whole block otherwise is set to 0.

In the following we describe the principle of the palette mode which is the focus of the invention. The Palette mode is a new coding method that has been presented in the scope of the Range Extension. This method is efficient for video coding targeting "screen content" video sequences. The palette method proposed to HEVC Range Extension is a type of prediction mode. It means that the Palette method is used to build a predictor for the coding of a given CU similarly to a prediction performed by Motion prediction (Inter case) or by an Intra prediction. After the generation of the prediction, a residual CU is transformed, quantized and coded.

A palette is generally represented by a table containing a set of N-tuples colors, each color being defined by its components in a given color space. For example, in a typical RGB format, the palette is composed of a list of P elements of N-tuple (where N=3 for a RGB). More precisely, each element corresponds to a fixed triplet of color in the RGB format. Of course this is not limited to a RGB or YUV color format. Any other color format can be represented by a palette and can use a smaller or a higher number of colors (meaning that N is different from 3).

At the encoder side, the Palette mode, under consideration in RExt, consists in transforming pixel values of a given input CU into a finite number of indexes (or levels). These indexes refer to the indexes of an associated palette which define a limited number of colors. After applying the Palette mode method, the resulting CU is composed of indexes and is then transmitted to the decoder with the associated palette (a table of limited triplets used to represent the CU).

To apply the Palette mode at the encoder side, we may proceed in a number of ways, but the simplest way to represent a block of pixels is as follows:
   Find the P triplets describing at best the CU of pixels to code (e.g. by minimizing the overall distortion);
   Then associate to each pixel the closest color among the P triplets: the value to encode is then the corresponding index.

At the decoder side, the Palette mode consists in operating the conversion in the reverse way. This means that for each decoded index associated to each pixel of the CU, the process consists in reconstructing the CU by using the palette encoded in the bitstream for each CU. It means that each index associated to each pixel is replaced by the color in order to reconstruct the corresponding color for each pixel of the CU. As already mentioned, the Palette mode is a prediction mode, this means that a residual coding can be associated. It is then added to the prediction to build the final reconstructed CU.

Figure 7A:
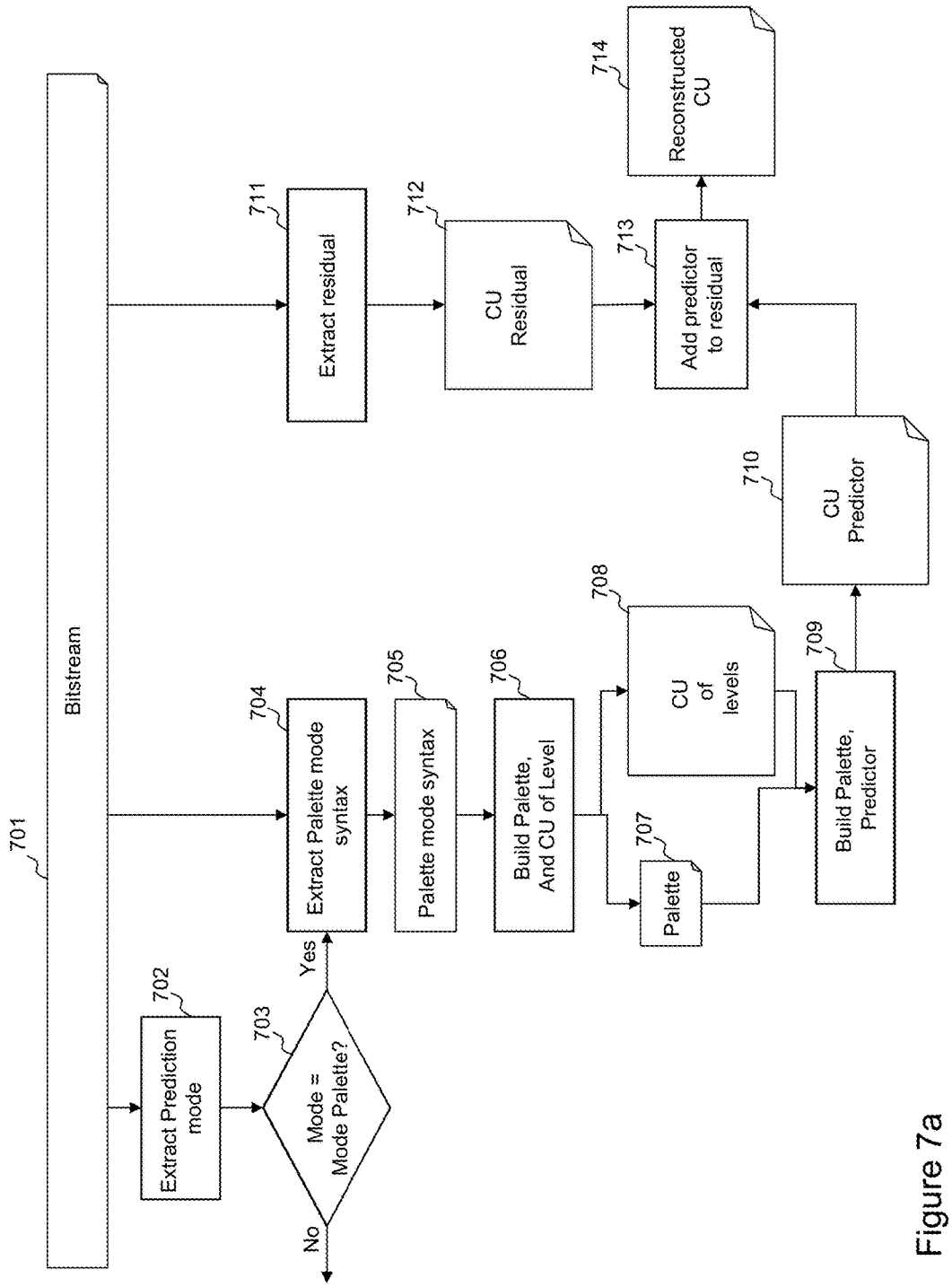
FIG. 7a illustrates a first decoding process for decoding pixel values according to the Palette mode.

FIG. 7a further illustrates the principle of Palette mode prediction at the decoder side under investigation in the Range Extension of HEVC. The prediction mode for the current CU is extracted in step (702) from the bitstream (701). Currently, the Palette mode is identified by a flag located before the skip flag in the bitstream. This flag is CABAC coded using a single context. If this mode is the palette mode (703) then the related syntax of the palette mode (705) is extracted (704) from the bitstream (701).

Then, during the step (706), two elements are built: the palette (707) and the block/CU of levels (708). According to this block/CU of levels and the associated palette, the block/CU predictor (in pixel domain) (710) is built (709). It means that for each level of the block/CU, a (RGB or YUV) color is associated to each pixel.

Then the CU residue is decoded (711) from the bitstream (701). In the current implementation Palette mode under investigation in the Range Extension, the residual associated to a Palette mode is coded using the common HEVC Inter residual coding method. To obtain the residue of the CU, the traditional inverse quantization and inverse transformation are performed. The block predictor (710) is added (713) to this block residual (712) in order to form the reconstructed CU (714).

Figure 7B:
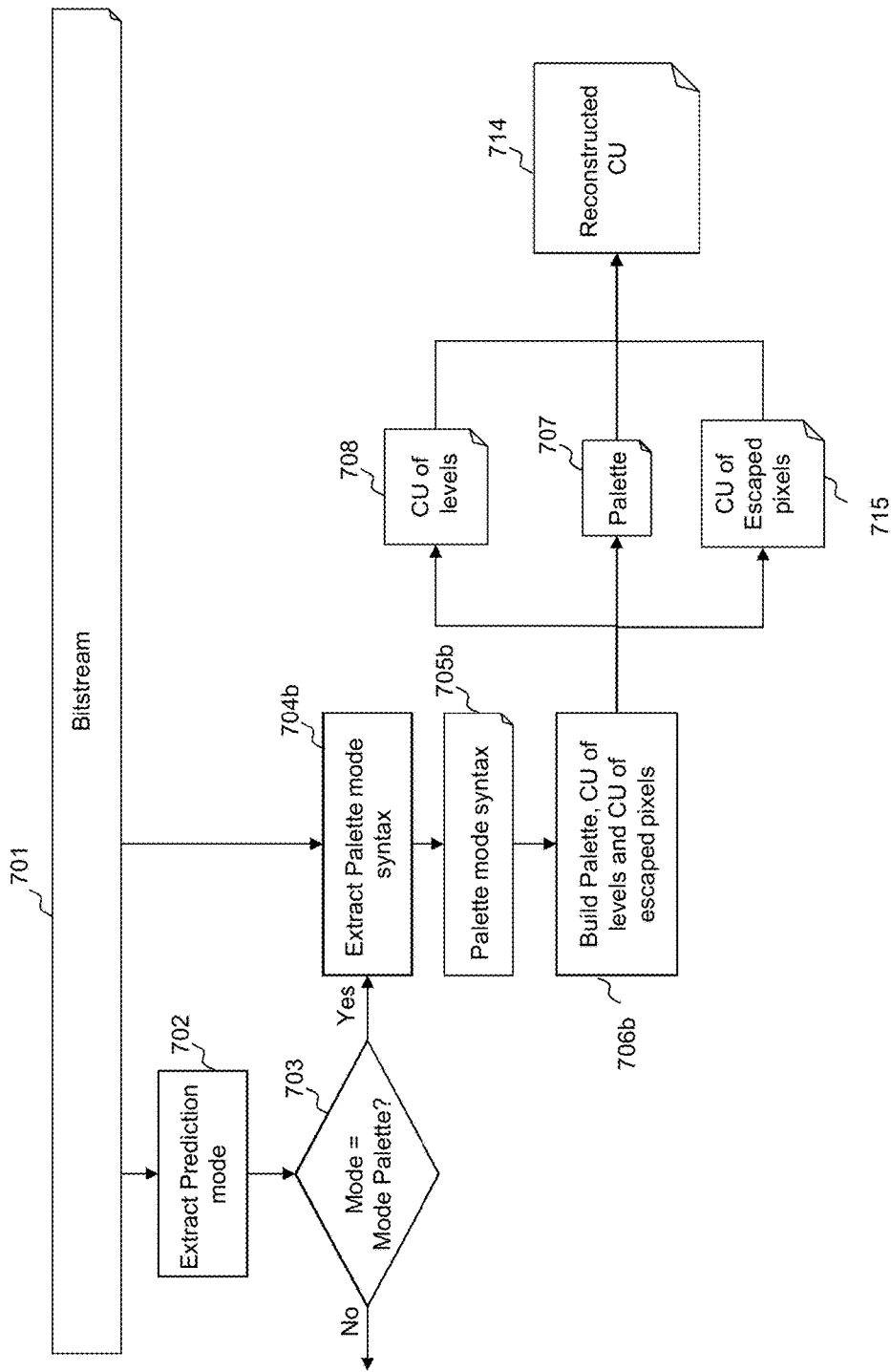
FIG. 7b illustrates a second decoding process for decoding pixel values according to the Palette mode.

FIG. 7b describes another implementation of the Palette mode at the decoder side under investigation in the Screen coding Extension of HEVC. In that case, there is no residual and no prediction per se. Instead, the pixels that can't be properly represented by the palette are coded as escaped values, i.e. an index is used to indicate that explicit, quantized pixel values are transmitted. When a pixel has been coded as an escaped value, an escape flag as described below has been set to a predetermined value. As a consequence, compared to FIG. 7a, few steps are modified. Because the syntax has slightly changed given no residual has been encoded, step 704b extracts a specific syntax 705b compared to 705. Indeed in this new mode pixel values have been coded using the Palette mode if possible. Otherwise if the pixel value could not be coded using the Palette elements (for example because the palette has reached its maximum size and no new value can be added), the pixel value was coded as an escaped value.

The decoder then, as in step 706 in FIG. 7a, also reconstructs a Palette 707, a CU of levels 108 and in addition a block 715 of escape pixel values during step 706b. This new block 715 is combined to the already known block 708 and palette 707 to produce the output block 714.

FIG. 8a illustrates the principle of the Palette method at encoder side. The current CU 801 is converted into a block 802 of the same size which contains levels instead of pixels with 3 values (Y, U, V) or (R, G, B). The Palette associated to this block or CU 803 is built and contains for each level entry the related pixel color values. Please note that for monochrome application, the pixel value can contain only one component.

Figure 8B:
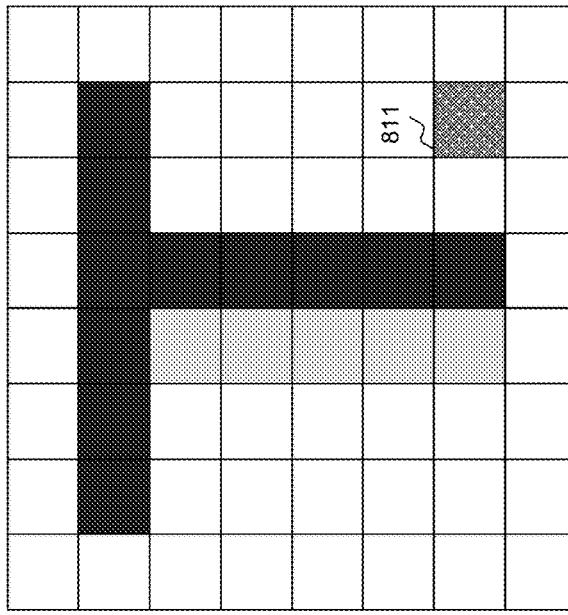
FIG. 8b illustrates another example of the palette and block/CU of levels derivation in relation to FIG. 7b.

FIG. 8b extends this principle with the use of escaped pixels values in relation with FIG. 7a. When a pixel value 811 of pixel block 801b cannot be represented by a palette element, it is therefore signaled as being an escape value. This can be signaled by using a specific index level inside of 802b (similar to 708), e.g. 812 (taking value 3), whose entry 813 inside palette 803b (similar to 707) is actually undefined: no palette element is actually transmitted. Instead, escaped pixel values are transmitted as part of 804b (similar to 715). Obviously, another means than 812/813 can be used to signal and transmit escaped pixel values like an escape flag.

As mentioned in FIG. 7a, the palette is coded and inserted in the bitstream for each CU. In the same way, the block/CU of levels is coded and inserted in the bitstream and an example is given in FIG. 9. In this example, the CU is processed row by row in a horizontal order (e.g. from left to right).

In FIG. 9, the block/CU (91) of levels is exactly the same as the one in FIG. 802). The tables (92) and (93) describe the successive steps to process the block/CU (91). Table (93) should be read as the following steps of table (92). The colors used in these tables correspond to the eight steps for processing the pixels block/CU (91) having the same colors.

These two tables depict the current syntax associated to the Palette mode. These syntax elements correspond to the encoded information associated in the bitstream for the CU (91). In these tables, 3 main syntax elements are used to fully represent the operations of the Palette mode and are used as follows:
   "Pred mode" flag
   When this flag is equal to "0": this means that a new level is used for the current pixel. The level is immediately signaled after this flag;
   When this flag is equal to "1": this means that a 'copy up' mode is used. More specifically, this means that the current pixel level corresponds to the pixel level located at the line immediately above (starting on the same position for a raster scan order). In that case of "Pred mode" flag equals to "1", there is no need to signal a level right after.
   The pixel level located at the line immediately above is in the spatial neighborhood of the current pixel.
   "Level"
   This syntax element indicates the level value of the palette for the current pixel.
   "Run"
   This syntax element has a different meaning which depends on the "pred mode" flag.
   When the "Fred mode" flag is equal to "0": this syntax element indicates the number of consecutive pixels where the same level is applied right after the current one. For example, if Run=8 this means that the current level is applied on the current sample (pixel location) and the following 8 samples which corresponds to 9 samples in total.

When the "Fred mode" flag is equal to "1": this syntax element indicates the number of consecutive pixels where the "copy up" mode is applied right after the current one. For example, if Run=31 this means that the level of the current sample is copied from the sample of the line above as well as the following 31 samples which corresponds to 32 samples in total.

Regarding tables (92) and (93), represent the eight steps to represent the block/CU (91) by using the Palette mode. Each step starts with the coding of the "Fred mode" flag which is followed by the level syntax element if the "Fred mode" flag is equal to "0" of by the "run" syntax element if the "Fred mode" flag is equal to "1". The "level" syntax element is always followed by a "run" syntax element.

Figure 10:
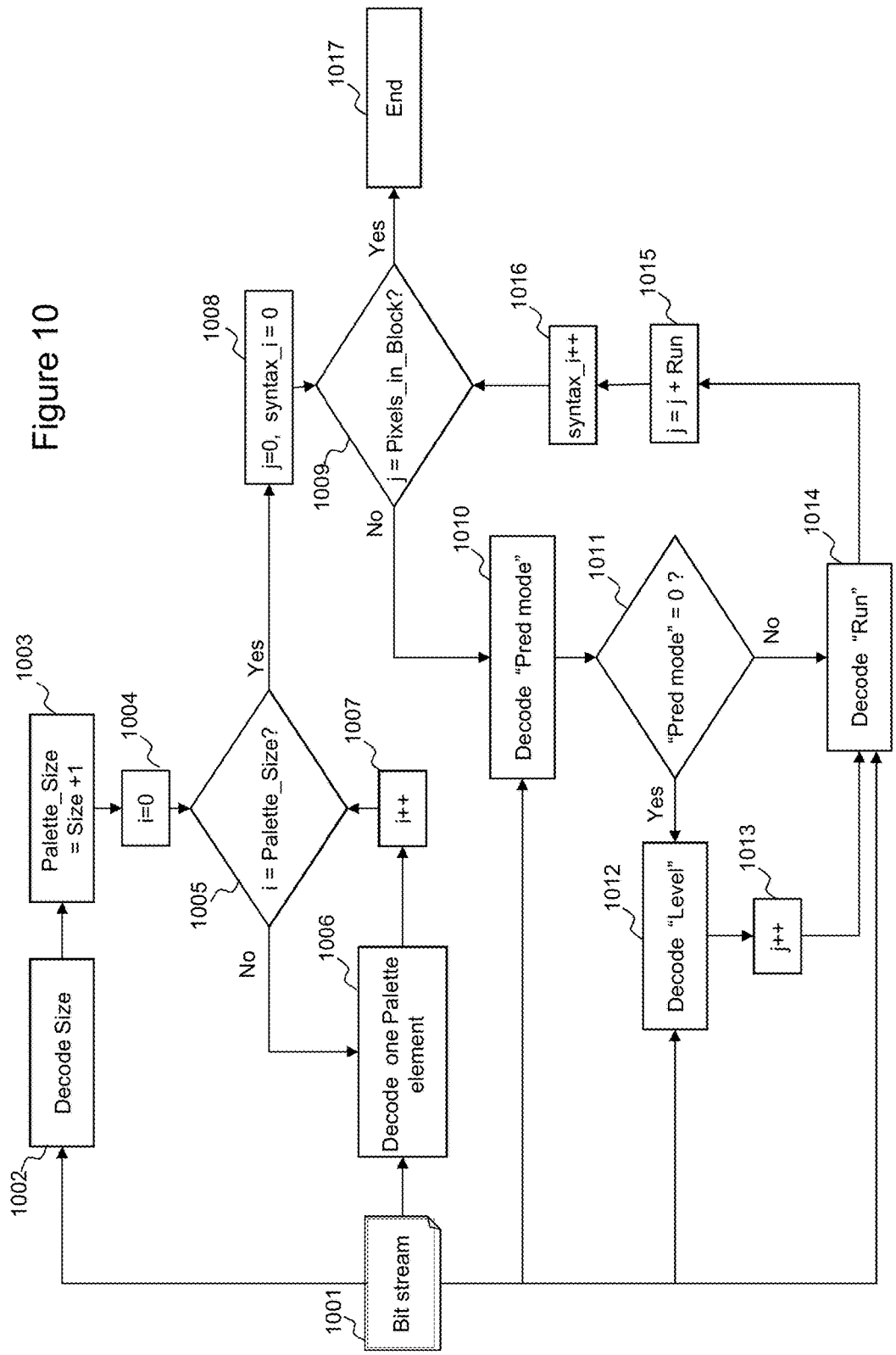
FIG. 10 illustrates the decoding process of the palette mode syntax.

FIG. 10 represents the syntax elements decoding of the Palette mode

Figure 11:
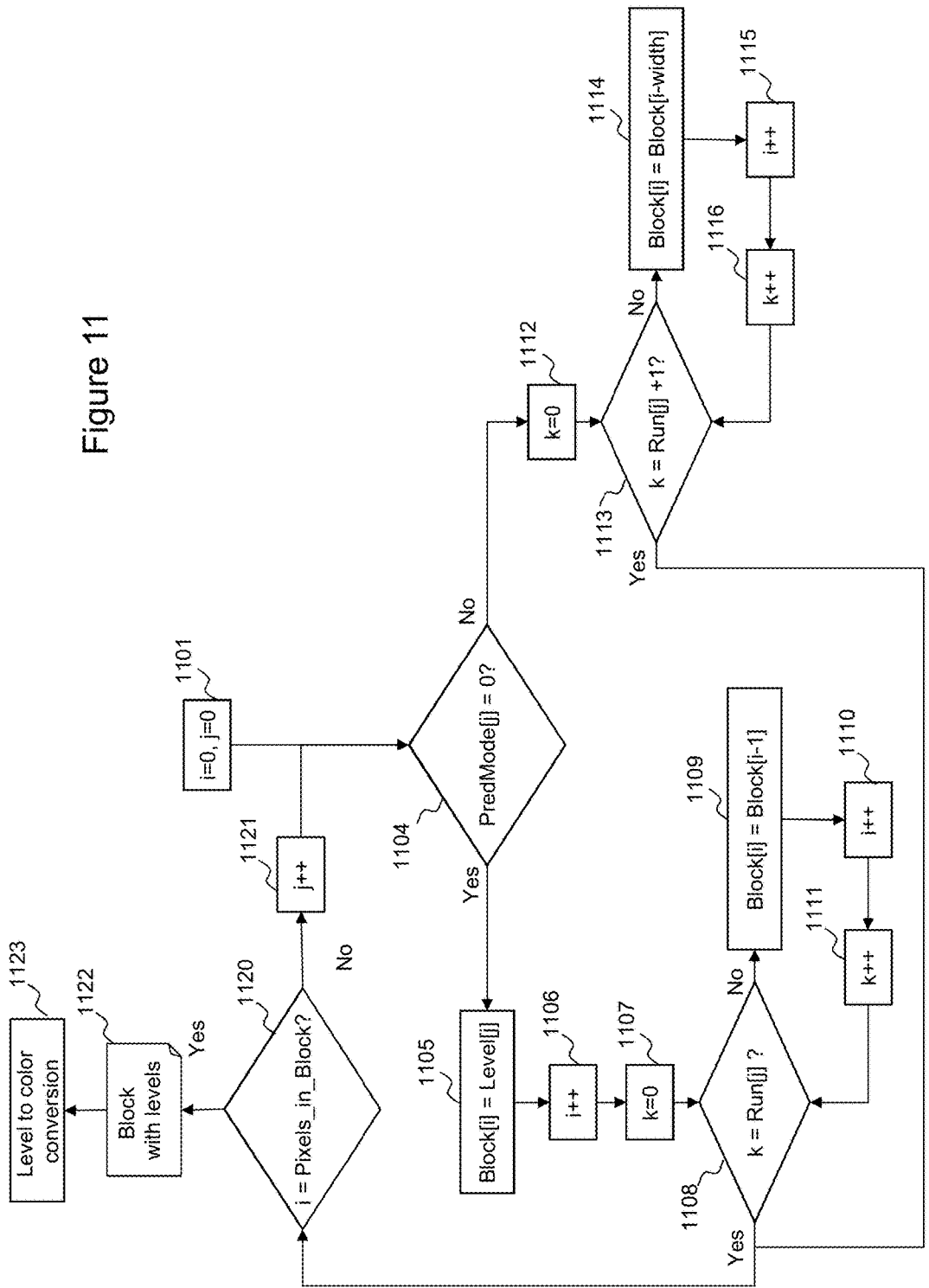
FIG. 11 illustrates the construction of the block/CU of levels at decoder side.

When the prediction mode decoded for the current block is the palette mode, the decoder first decodes the syntax related to this block and then applies the reconstruction process for the CU described in FIG. 11.

FIG. 10 illustrates in details the decoding process of the syntax elements related to the Palette mode. First, the size of the palette is extracted and decoded (1002) from the bitstream (1001). The exact size of the palette (Palette_size) is obtained by adding 1 to this size value decoded at step (1002). Indeed, the size is coded by using a unary code for which the value 0 has the smallest number of bits (1 bit) and the size of the palette cannot be equal to 0, otherwise no pixel value can be used to build the block predictor.

Then the process corresponding to the palette values decoding starts. A variable i corresponding to the index of the palette is set equal to 0 (1004) then a test is performed in step 1005 to check if i is equal to the palette size (Palette_size). If it is not the case, one palette element is extracted from the bitstream (1001) and decoded (1006) and is then added to the palette with the related level/index equal to i. Then the variable i is incremented through the step (1007). If i is equal to the palette size (1005), the palette has been completely decoded.

Then the process corresponding to the decoding of the block of levels is performed. First, the variable j, corresponding to a pixel counter, is set to 0 as well as the variable syntax_i (1008). Then a check is performed to know if the pixel counter corresponds to the number of pixels contained in the block/CU. If the answer is yes at step (1009) the process is ended with step (1017), otherwise the value of the flag "Pred mode" corresponding to one prediction mode is extracted from the bitstream (1001) and decoded (1010).

The value of "Pred mode" is added to a table at the index syntax_i containing all "Pred mode" value decoded. If the value of this "Pred mode" is equal to 0 (1011), the syntax element corresponding to "Level" is extracted from the bitstream (1001) and decoded (1012). This variable "Level" is added to a table at the index syntax_i containing all levels decoded. The variable j corresponding to the pixel counter is incremented by one (1013).

Then the "Run" syntax element is decoded in step (1014). If the syntax element "Pred Mode" is equal to 1 (1011), the "Run" value is also decoded in step (1014). This syntax element "Run" is added to a table at the index syntax_i containing all the runs decoded.

Then in step (1015), the value j is incremented by the value of the run decoded in step (1014). The variable syntax_i is incremented (1016). If the counter j is equal to the number of pixels in the block then the syntax to build the palette predictor is finished (1017). At the end of this process related to the Palette, the decoder knows the palette, and the tables containing the list of all the "Pred mode", "Level" and "Run" syntax elements associated to the Palette prediction mode of this CU. The decoder can then proceed with the reconstruction process of the CU.

The following table gives the entropic code uses for each syntax element.

| Syntax element | Entropy codes |
| --- | --- |
| Palette element (Y, U, V) or (R, G, B) (step 1006) | 3 binary codes corresponding to the 3 colors (Y, U, V) or (R, G, B). The binary code length corresponds to the bit depth of the each color component. Example: 8 bits to represent 256 values. |
| "Palette_size" (step 1002) | Unary code |
| "Pred mode" | 1 bit |
| "Level" | Binary code b bits, b is the integer such that $2^b$ is the smallest integer equal or superior to the Palette_size, ie. for P = 14, b = 4 and for P = 4, b = 2 |
| "Run" | Golomb_H(Param = 3) as described in FIG. 6. |

FIG. 11 illustrates the reconstruction process to build the CU which will be used as predictor. The input data of this process are the tables containing the list of "Pred mode", "Level" and "Run", and the block/CU size.

In a first step (1101), the variable i, representing a pixel counter, is set equal to 0 and the variable j is also set equal to 0. Then the element extracted from the table of "Pred mode" at the index j is checked if it is equal to 0 (1104). If it is equal to 0, this means that a new level is encoded for this current pixel i. So the value of the pixel at position i is set equal to the level at the index j from the table of levels (1105) (Block[i]=Level[j]).

The variable i is incremented by one (1106). The variable k is set equal to 0 (1107). A check is performed in (1108) to know if k is equal to the "Run" element of the table of runs at the index j. If it is not the case, the value (level value) of the pixel at position i is set equal to the value (level value) of the pixel at position i-1 (1109), corresponding to the following expression Block[i]=Block[i-1]. The variable i (1110) and the variable k (1111) are then incremented by one. If the check in step 1108 returns yes, the propagation of the left level value is finished and the step 1120 is performed.

When the check at step 1104 returns the value No, the "copy up" mode starts. The variable k is set equal to 0 (1112). The step 1113 checks if (k-1) is equal to the "Run" element of the table of runs at the index j. If it is not the case, the value (level value) of the pixel at position i is set equal to the value (level value) of the pixel at position i of the above line (1114). This corresponds to the following expression Block[i]=Block[i-width]. The value "width" is the width of the block/CU. The variable i and the variable k are then incremented by one in steps 1115 and 1116. If the check at step 1113 returns the value yes, the prediction mode 'copy up' is completed and the next step 1120 is performed.

At step 1120, a check is performed to know if the variable i is equal to the amount of pixels in the block/CU. If it is not the case the variable j is incremented by one (1121) and the process continues with step (1104) already described above.

If the check is positive at step (1120), all the levels are affected to each pixel of the block in step (1122).

Then the final stage (1123) consists in converting each level in color value according to the palette content. This process affects a pixel value (Y, U, V) or (R, G, B) at each block position according to the level of this position in the block and the entries of the palette.

Figure 12:
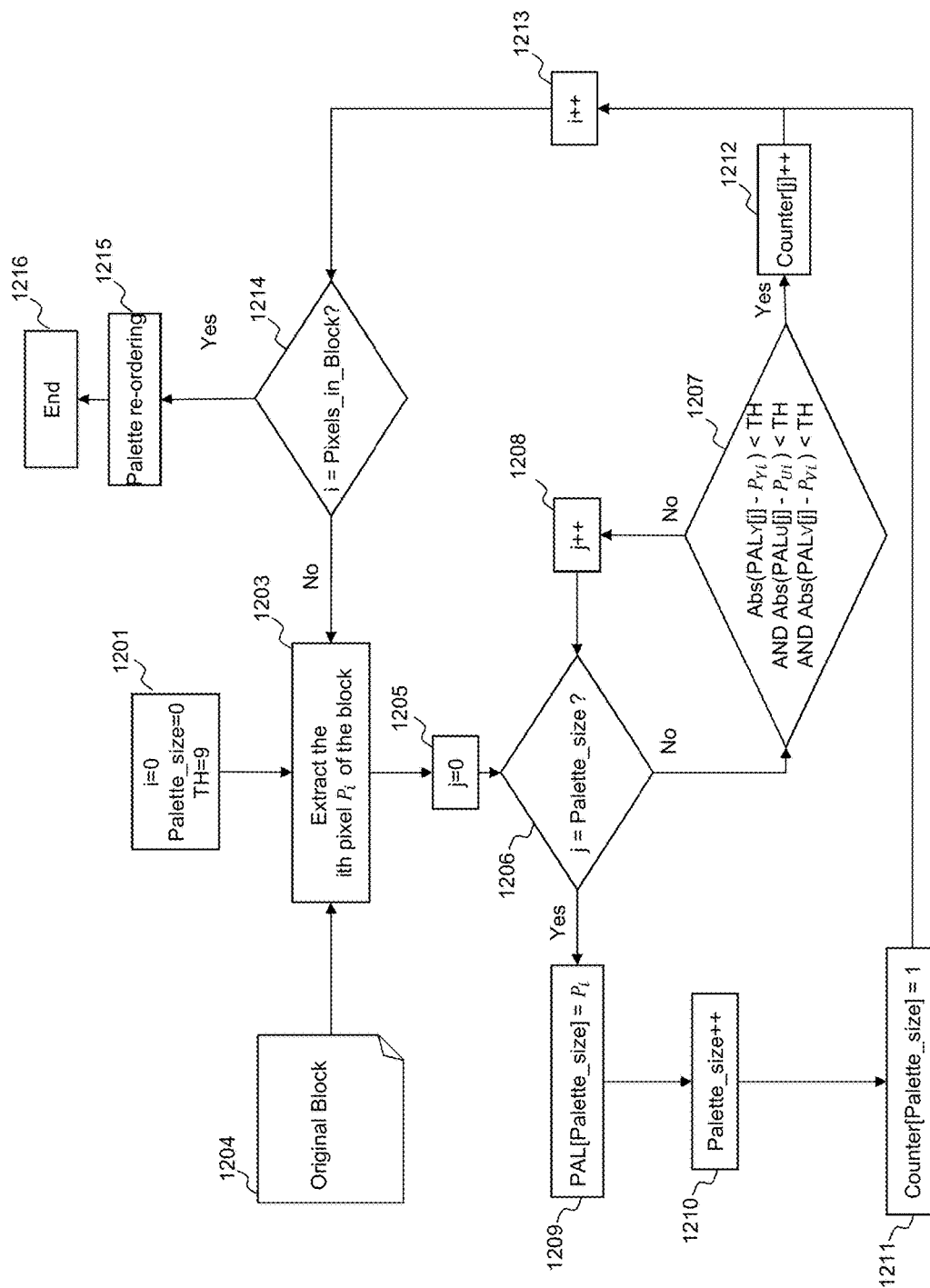
FIG. 12 illustrates the palette determination algorithm at encoder side.

FIG. 12 illustrates the palette determination algorithm at encoder side. The input data of this process are the original block/CU and the block/CU size.

In this example, we are creating a YUV palette but a RGB palette could be built in the same way.

In a first step (1201), the variable representing a pixel counter "i" and the variable "Palette_size" are set to 0. A variable "TH" representative of a threshold is set to 9. Then in step (1203) the pixel pi is read (1203) from the original block (1204). Then the variable j is set equal to 0 (1205) and at step (1206) a check is performed to know if the palette size is equal to the variable "j".

If it is the case, the palette at the index "j" is set equal to the pixel value pi (1209). This means that the current pixel Pi becomes an entry of the palette. More precisely the following assignment is performed:

PALY[j]=(Yi)
PALU[j]=(Ui)
PALV[j]=(Vi)

The palette size (Palette_size) is incremented by one (1210) and an occurrence table is set equal to 1 for the index 'Palette size' (1211). Then the variable i is incremented (1213) to consider the next pixel "i" of the block/CU.

A check is performed in step (1214) to know if all pixels of the block/CU have been processed. If "yes", the process is completed by the ordering process (1215) explained later otherwise the next pixel is considered in step (1203) which was already described.

Coming back to step (1206) when the check returns the value "No", the next step is step (1207) where the absolute value for each colour component between pi and the palette element at the index j is computed. If all the absolute differences is strictly inferior to a threshold equal to TH (set to 9 in this embodiment), the occurrence counter regarding the entry "j" in the palette is incremented by one. After step (1212), the next step is step (1213) which was already described.

In step (1207) when the check returns a negative answer, the variable j is incremented (1208) to compare the other palette elements to the current pixel (1207). If no element in the palette respects the criterion (1207) a new element is added to the palette (1209, 1210, 1211).

Please note that for the decision module (1207) can compare each color element for a 444 (YUV or RGB) sequences and can only compare the Luma colour component for 420 sequences.

At the end of this process, the table "Counter" contains the occurrences of the palette elements. Then the palette elements are ordered in step (1215) according to their occurrences so that the most frequent element is in the first position in the palette.

Moreover, the palette size can exceed the maximum size of the palette which is fixed to 24 in the current implementation. If the palette size exceeds 24, the palette size is set equal to 24 and the remaining elements are removed from the palette. At the end of these processes the palette is built. It is only an example of implementation and it is possible to build the palette directly with this algorithm.

Figure 13:
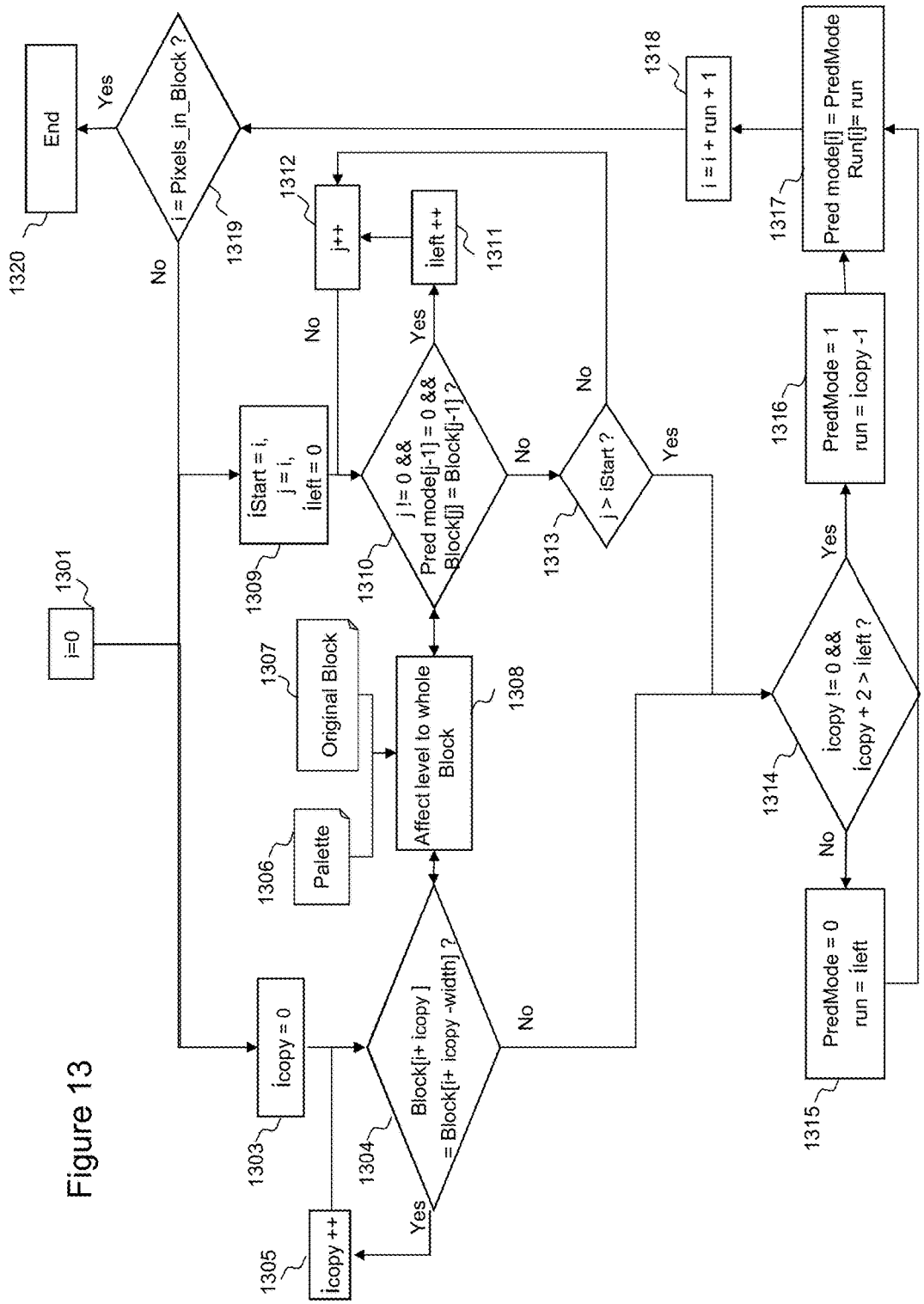
FIG. 13 illustrates the process selection of the current implementation of the block/CU of levels, prediction modes and runs.

FIG. 13 illustrates the process of selection of the current implementation of the block of levels, prediction modes and runs. The input data of this process are the original block/CU, the palette and the block/CU size.

In a first step, the variable "i" relative to a pixel counter is set to 0 (1301).

The 2 modes of prediction ("Pred mode"=0 and "Pred mode"=1) are evaluated independently.

For the 'copy up' prediction (corresponding to "Pred mode"=1), the variable "icopy" is set equal to 0 (1303). Then the step (1304) checks if the current level at pixel location Block[i+icopy] is equal to the level of the pixel in the above line corresponding to the location Block[i+icopy−width] where "width" corresponds to the width of the current block CU considered. If the answer is positive, the variable "icopy" is incremented by one in step (1305).

Please note that the level of each index of the block/CU is determined in parallel in step (1308). This consists in affecting to the pixel at the position i the Ie closest palette element (1308). This process used, the position i, the palette (1306) and the original block (1307). In step (1308), a level is associated to the sample located a position "i" in the block/CU.

If at step (1304) the answer returns "No", the variable "icopy" is transmitted to the decision module 1314. This variable "icopy" corresponds to the number of value copied from the up line.

In parallel (or sequentially), the loop to determine the run value for the left prediction mode is processed. First the variable "iStart" and "j" are set equal to "i" and "ileft" is set equal to 0 (1309). At step (1310) a check is performed to know if j !=0 and if "Pred mode[j−1]"=0 and if Block[j] =Block[j−1]. If it is true, the variable "ileft" is incremented by one (1311) and the variable j is incremented (1312).

When at step 1310, the answer is "No", the next step is (1313) where a new check is performed. If "j" is superior to "iStart" (1313). So it checks if it is not the first value of the prediction mode which is not predicted and directly encoded with the level (j !=0 or Pred mode[j−1]=0). If it is not the first value the variable "ileft" is transmitted to the decision module 1314. And it is the first checked level (1313), only the variable j is incremented. In the same way as the loop for copy up prediction, the level at the index i Block[i] is determined in the same loop (1308).

After computing the maximum run for the 'left prediction' and the 'copy up' mode, the variable "ileft" and "icopy" are compared (1314) according to know if "icopy" !=0 and "icopy"+2 is superior to "ileft". It means that if "icopy" is equal to 0, the "left prediction" mode is selected ("icopy" !=0) (1315). If it is different to 0 and that "icopy"+2 is superior to "ileft" the "copy up" mode is selected (1316). For the "left prediction" mode the "PredMode" variable is set equal to 0 and the run to "ileft" (1315). For the 'copy up' mode the "PredMode" variable is set equal to 1 and the run to "icopy"−1' (1316).

Then the tables containing the "Pred mode" and the "Run" are updated with the current value "Pred mode" and "run" (1317). Please note, that the next position to consider in step (1318) correspond to the current position incremented by the "run" value. Then a check is performed in step (1319) to know the last pixels have been processed. If yes the process is completed (1320) otherwise evaluation of the two prediction modes "left prediction" and "copy up" are evaluated for the next pixel position.

At the end of this process, the encoder know the levels for each sample of the block/CU, and is able to encode the corresponding syntax of the block/CU based on the content of the two tables "Pred mode" and "Run".

To determine the block prediction, the encoder then converts the defined block of levels according to the palette.

In a first embodiment of the present invention, the encoding/decoding of the "Pred mode" is avoided for the first line of a block of levels. In this embodiment, only the mode "Pred mode"=0, corresponding to signalling of a level, is used for the first line. Indeed, "Pred mode"=1, the "copy up" prediction mode, can be considered as non-applicable for the first line because an above line doesn't exist or this above line is not in the block of levels being encoded, or if it belongs to a palette mode, this line should not use the same palette. The advantage of this embodiment is that it saves bits to the signalling of the "Fred mode" where the "copy up" prediction mode is available.

Figure 14:
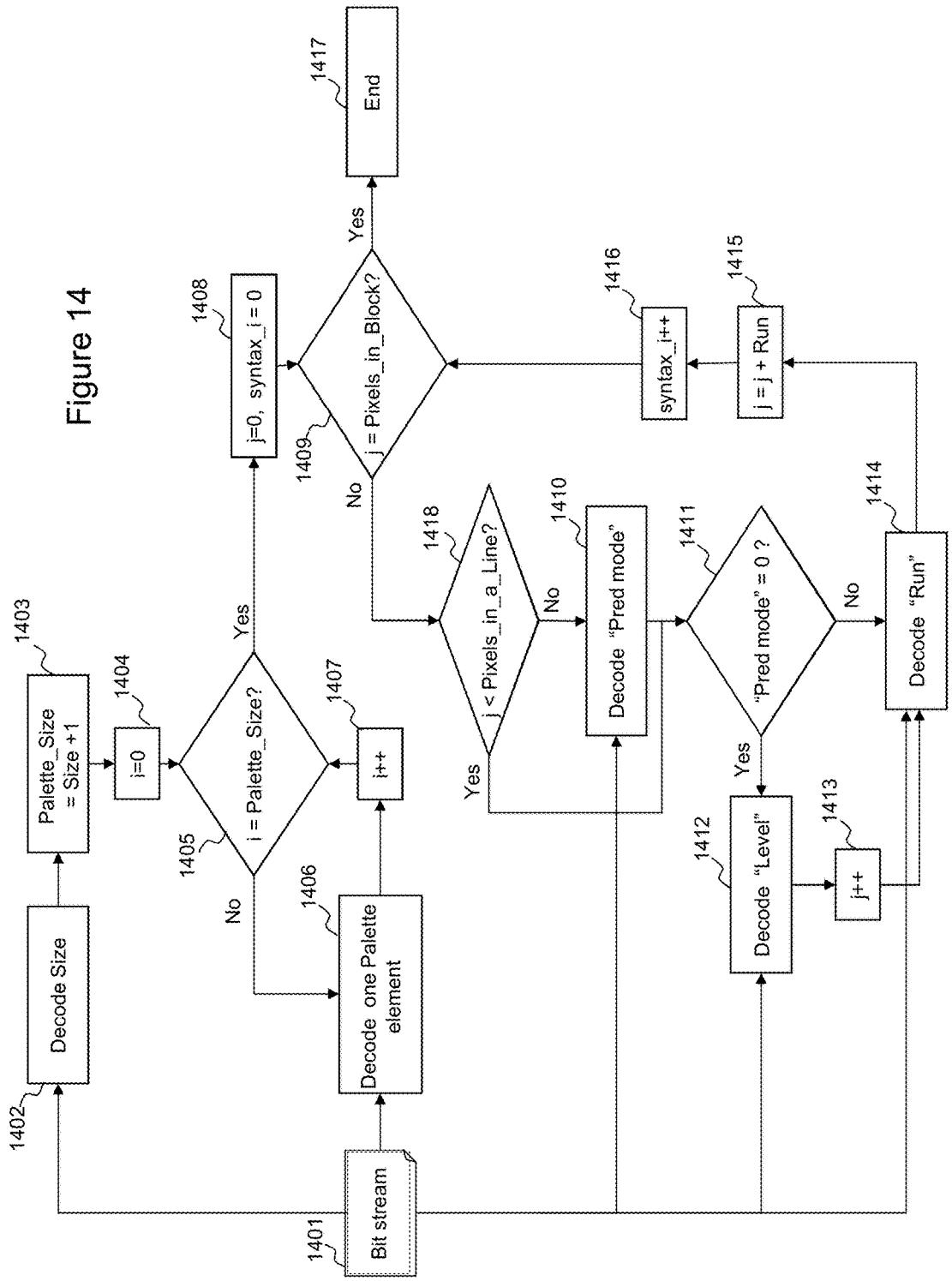
FIG. 14 illustrates a first embodiment of the invention.

FIG. 14 illustrates this embodiment. FIG. 14 is based on FIG. 10. Modules 1401 to 1417 are the same as modules 1001 to 1017. Module 1418 has been added to avoid the decoding of the "Pred mode" when the variable j is less than the number of pixels in a line.

An alternative to this embodiment is to apply a level selection process to the above line. It consists in affecting a level to each pixel of the above line. In that case, the 'copy up' mode has the same functioning as in the inside block and can copy some levels of this above line. If this above line belongs to another palette mode CU, the levels corresponding to this above line can be used for the 'copy up' mode of the current palette, even if the palette of the above CU and the current CU could be different.

Figure 15:
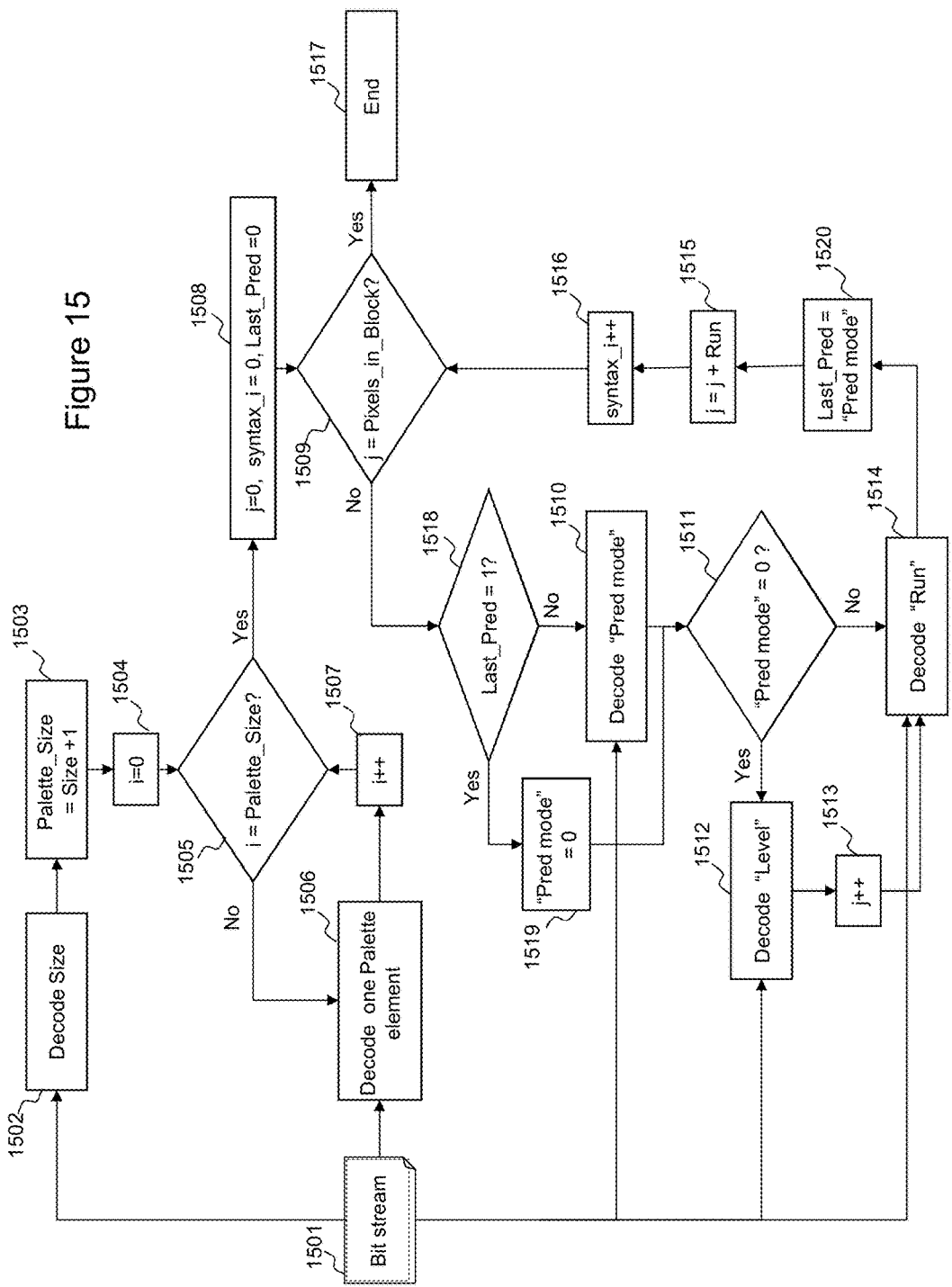
FIG. 15 illustrates a second embodiment of the invention.

In one embodiment, the decoding of the "Pred mode" depends on the last decoded "Pred mode". The "Pred mode" is not decoded when the last decoded "Pred mode" is equal to 1 ('copy up'). Indeed, if the last mode is 'copy up', the simple way to select that the current level is equal to the above level is to add +1 to the run of the last 'copy up'. The advantage of this embodiment is to save the signaling of "Pred mode" after a 'copy up' prediction mode. FIG. 15 illustrates this embodiment. FIG. 15 is based on FIG. 10. Modules 1501 to 1517 are the same as modules 1001 to 1017, except module 1508 where the Last_Pred variable is set equal to 0. Module 1518 checks if this Last_Pred is set equal to 1 ('copy up'). If it is the case, the variable "Pred mode" is not extracted from the bitstream and it is set equal to 0 (1519). Moreover, after decoding the level and/or the run value, the variable Last_Pred is set equal to "Pred mode" (1520).

In an alternative embodiment the "Pred mode" is always decoded, but when it happens, the decoding process is changed. So, when a 'copy up' follows a 'copy up', the "Pred mode"=0 is applied without transmitting a level. The level copied is set equal to the last decoded level (the left level). The advantage of this embodiment is that it avoids a parsing dependency between the "Pred mode" and the last decoded "Pred mode".

In one embodiment, the "Fred mode" depends on the last decoded "Fred mode" and on the left level and on the above level. The "Fred mode" is not decoded if the last decoded "Pred mode" is equal to 0 and if the above level is equal to the left level. Indeed, in that case, the simple way to select that the current level is equal to the above level is to add 1 to the run of the last "Fred mode". As the previous embodiment, the advantage is to save the bits related to "Fred mode" when this condition is true.

In one embodiment of the invention, the value of a decoded level depends on the value of the last "Fred mode" and according to this "Pred mode" the decoded level depends on the value of the left level or of the above level. Indeed, when the Last_pred is equal to 0, the level should not be equal to the left level otherwise it is simpler to set +1 to the run value. In the same way, when the Last_pred is equal to 1 (copy up'), the level should not be equal to the above level otherwise it is simpler to set +1 to the run value. The advantage of this embodiment is that it saves some bits in the coding of the level. So, when the Last_Pred is equal to 0, if the current level is greater than the left level it is set to level minus 1. In the same way, when the Last_Pred is equal to 1, if the current level is superior to the above level it is set to level minus 1. Moreover the maximum possible level value is decremented. Please note that, as mentioned in the prior art section, the maximum value is used to fix the number of bits per level in the current implementation. Note that, the maximum size is the Palette_size. This embodiment is especially efficient when only the Palette_size is equal to 2. Indeed in that case no level needs to be coded except the first level. To simplify the implementation, this embodiment is applied only when the Palette_size is equal to 2.

Figure 16:
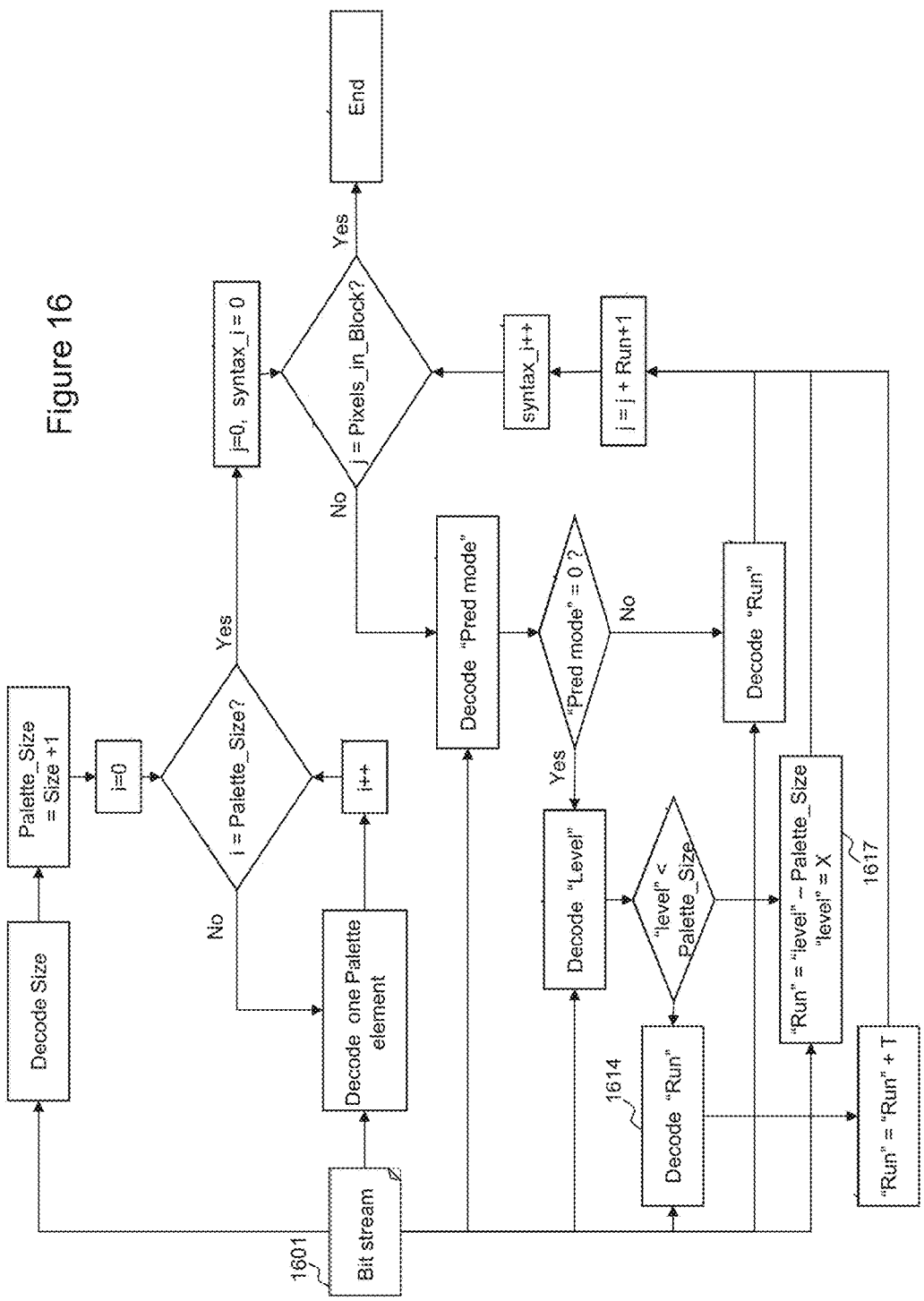
FIG. 16 illustrates another embodiment of the invention related to the combination of level and run coding.

In another embodiment on FIG. 16, the "level" value contains information about the run. In particular, if the "level" is coded using fixed length coding, then some possible codewords would be unexploited and can be forced to hold more information. In this case, if the decoded "level" is above or equal to Palette_Size, then this value corresponds to a specific run length and "level". In FIG. 16, we have illustrated a specific case in 1617 where The run value can be deduced to be "level"—Palette_Size
The "level" is some other "level" of value X (typically 0) actually part of the palette (ie "level"<Palette_Size)

One can of course imagine that each "level" above or equal to Palette_Size may represent specific "level" and "Run" values. This may impact how the run is actually encoded in this case: the above implies that some combinations of "level" and "Run" values do not have their "Run" value explicitly transmitted. In our specific example, we know that "level" values from Palette_Size to $2^B-1$ encode "Run" values, so "Run" values from 0 to $T=2^B-1-$Palette_Size are not encoded. Here P is the number of palette elements and B the integer such that 2B is the smallest integer such that 2B≥P. In that case, the decoded "Run" value can be incremented by T. Having this in mind, one can in addition imagine a specific entropy code for this specific case (step 1614), e.g. an exponential Golomb code of order 3.

Figure 17:
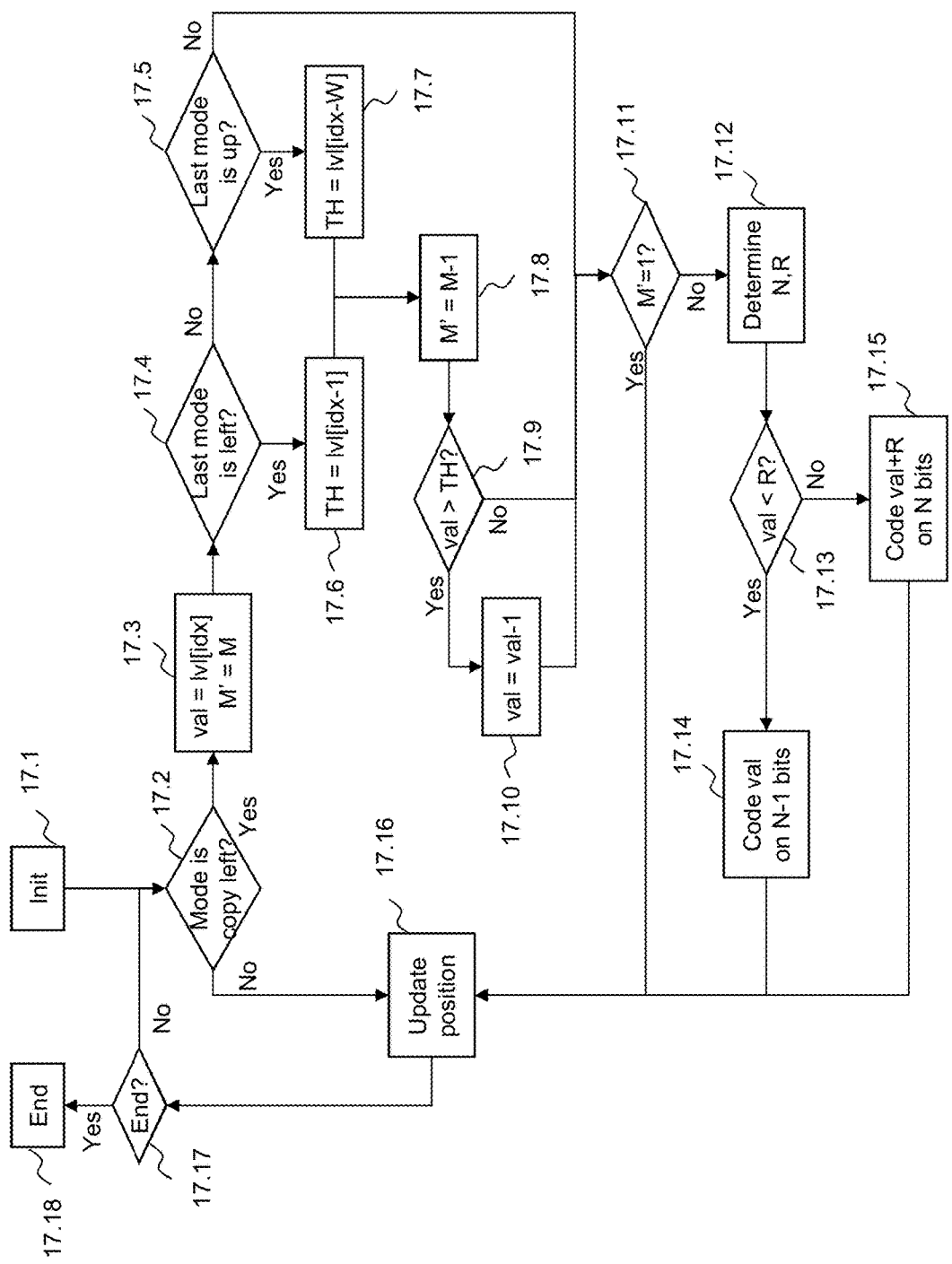
FIG. 17 illustrates the coding of the index taking into account sparse index lists as determined from the previous prediction mode.

FIG. 17 illustrates a simplified embodiment of the level (or the representative index) coding, its purpose being to only illustrate this coding. As a consequence, steps 17.3 to 17.15 are the ones mattering to the embodiment, while the others are kept voluntarily simplified. Let "idx" be the position of a current level to code according to a raster scan order in the block of levels, lvl the array corresponding to said block, W the width of the block (in terms of number of levels per row) and M the number of elements in the current palette. So step 17.1 initializes the loop where the index coding is performed, most notably by setting the current position "idx" in the block to 0. Step 17.2 checks whether the level must be coded: this is in the preferred embodiment similar to checking whether the prediction mode at position "idx" is "copy left".

If no level needs to be coded, then processing skips directly to step 17.16, otherwise it continues to step 17.3. This step prepares the coding of the level by setting the value of variable "val" to code to lvl[idx] and the number of possible levels "M" in the sparse list to "M" (i.e. no element absent). Then step 17.4 checks whether the last mode, i.e. the previously used prediction mode in raster scan order, was "copy left". If it cannot be determined (e.g. because "idx" is 0), or because the last mode was the mode known as "escape mode" or because the last mode is not "copy left", then processing continues on step 17.5, otherwise step 17.6 occurs and a temporary variable "TH" is set to the previous level in raster scan order 17.7 then goes on step 17.8.

In another embodiment, the step 17.4 could comprise the checking whether the prediction mode at position "idx−1" (last mode) was "copy left" and the checking whether the level at position "idx−1" satisfied a certain condition, in particular whether that level at position "idx−1" was less than a predetermined value LIMIT such as "lvl[idx−1] <LIMIT". This new embodiment is particularly useful for the case where the "run" function has been used for coding the previous blocks, this function implies coding the same value for all the consecutive blocks having the same level. However, in this embodiment, the run function may be deactivated for the blocks above a threshold value LIMIT. Going back to step 17.5, this step checks whether the previous mode was "copy up". As for step 17.4, if it can't be determined or it is not, then processing skips completely to step 17.11, otherwise the value of the variable TH is set to the level above the current one in raster scan order, by subtracting from the position a value equal to the number of level per row W. Then the process goes to step 17.8, in the same manner as the processing from 17.6 does. Both have set the variable TH, which is the one that is missing in the sparse list.

Indeed the variable TH represents a level value that cannot be taken at the position idx depending on the last mode used. For instance if the last mode was the "copy left mode", the level at idx cannot be the same as the level of idx−1, otherwise it would have been encoded with the last mode.

Therefore, M' is set to M−1 on step 17.8. Then step 17.9 compares the value "val" to code to the value of the variable TH: if it is greater than TH, then the value to code is decremented on step 17.10. Indeed if the value of val is less than TH, then it is not affected by the step 17.8. In all case, this is followed by step 17.11.

There, M' is compared to 1. If there is only one possible level, then its value can be inferred, and the level coding can be entirely skipped, and thus the processing skips to step 17.16.

Otherwise, on step 17.12, given the number M' of possible levels, a number of bits N, N≥0, and an integer value R, 0<R≤$2^N$, are determined so that M'=$2^N$−R, with the special case of M'=$2^N$ where instead N=N+1 and R=$2^N$ are taken. The values of N or R can be stored in either a table, or computed. For instance, one can imagine a system where N or $2^N$ or some variation thereof can be easily computed from M', and R can therefore be easily deduced. For M'=5, this would therefore be R=3 and N=3 and for M'=8, this would be R=8 and N=4. Then step 17.13 can occur. These values are devised so as to have simple encoding and decoding of the index codeword, but it will be appreciated by those skilled in that art that different decisions and codewords may be employed to achieve the same goal of attributing shorter codewords to specific levels.

It can be noted that if M'=$2^N$, then the special case occurs, and it is always followed by step 17.14, with N+1−1 bits instead of N−1. This can be implemented as additional checking and steps in FIG. 18, but it is simpler to let step 17.12 find values satisfying this behavior, in particular if it is implemented using a table.

Step 17.13 compares the value "val" to code to R. If it is below then the value can actually be coded on N−1 bits, as is done on step 17.14. Otherwise, N bits are needed, and instead, val+R is coded on N bits at step 17.15. This is done so that the decoder can only check N−1 bits before deciding whether to decode an additional bit, as will be made clearer in FIG. 18.

Going back to FIG. 17, whether at step 17.14 or 17.15, processing continues with 17.16. This is mere loop handling, where at least the position is updated to the next element to code. Once the position has been updated, it can be determined at step 17.17 whether the end of the block has been reached: if it has not, processing loops back to step 17.2, otherwise it ends on step 17.18.

Figure 18:
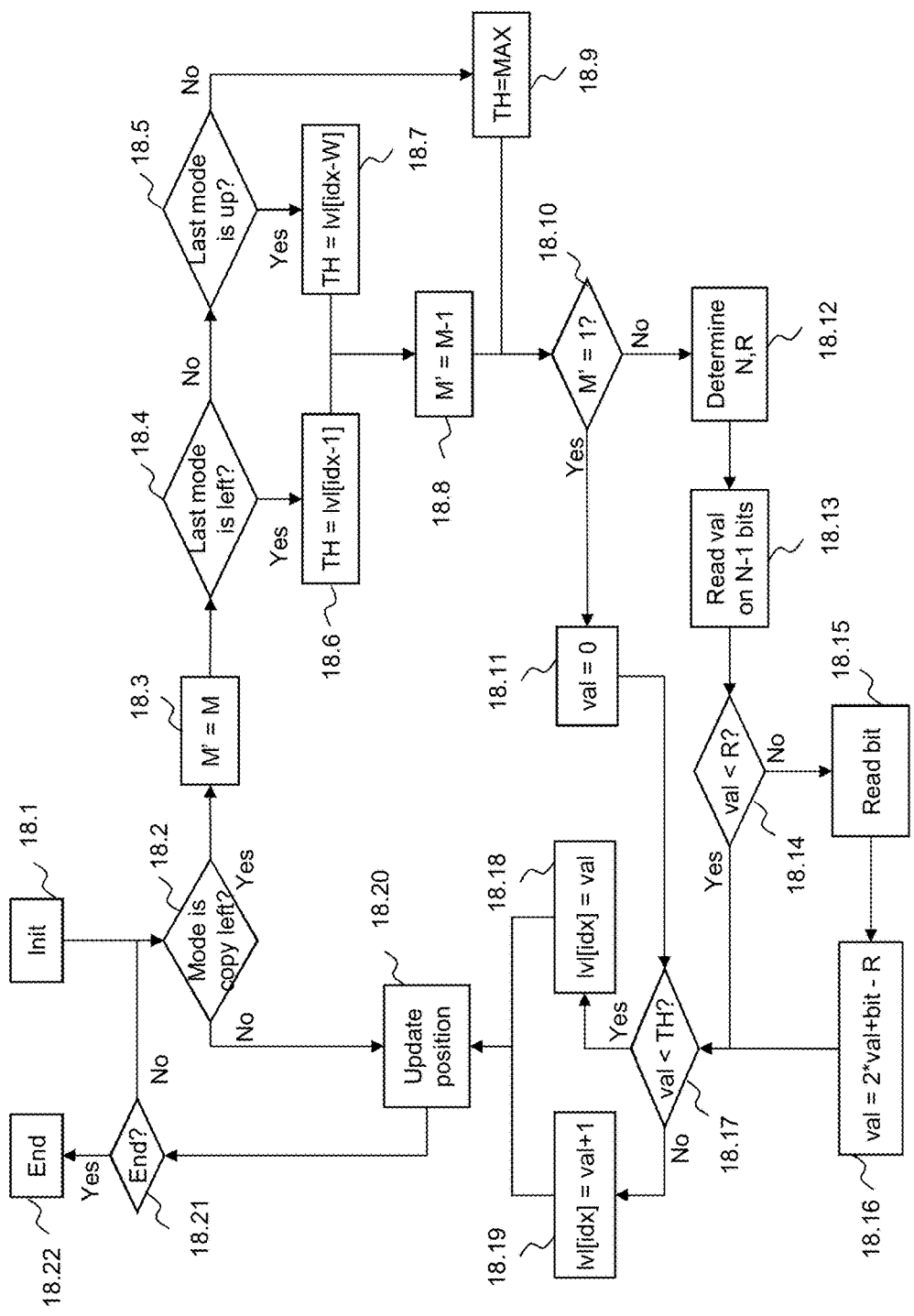
FIG. 18 illustrates the decoding of the index coded according to the coding process in FIG. 17.

We mentioned FIG. 18, illustrating the corresponding decoding process of FIG. 17, where the same meanings for "idx", "val", "M", "M'", "N" and "R" are kept. Step 18.1 initializes the decoding of the levels, e.g. by setting idx to 0. Then step 18.2 checks whether the current mode is "copy left": if it is not then no level (or index) needs to be decoded and processing skips to step 18.20. Otherwise, M' is set to M 18.3. Steps 18.4 and 18.5 are respectively checking whether the previously used mode is respectively "copy left" and "copy up", going to respectively steps 18.6 and 18.7 if it is the case or going to respectively steps 18.5 and 18.9, if it is not or this previous mode cannot be determined. Steps 18.6 and 18.7 set TH to the missing level, respectively the previous one and the one above, before going to step 18.8 where M' is set to M−1, as there is a level missing. Step 18.9 on the other hand sets TH to a maximum value MAX indicating that there is no value missing. Steps 18.8 and 18.9 are then followed by step 18.10.

Step 18.10 checks whether there is only one possible level, in which case it is implicit: on step 18.11, the decoded value val is set to 0. Otherwise, N and R is determined during step 18.12 as is done in step 17.12. As mentioned when describing FIG. 17, first, "val" is read from N−1 bits on step 18.13. This allows verifying on step 18.14 whether val is below R: if it is the case then the coded value was really coded on N−1 bits and it has already been fully decoded, so processing goes to step 18.17. Otherwise, one more bit is read on step 18.15. Step 18.16 can then determine the actual coded value which is 2*val+bit−R, with "bit" the value of the bit read (so either 0 or 1). Now that the coded value has been determined, step 18.17 can occur.

These are the reverse of steps 17.9 and 17.10: if the decoded value is below TH then the decoded value is the actual level and so step 18.18 sets it to "val". Otherwise, step 17.10 has occurred, therefore step 18.19 reverses the process by setting the current level to val+1. It should be noted that step 18.9 set TH to the maximal value MAX so that step 18.19 never occurs. In any case, next step 18.20 updates idx to the next position then goes to step 18.21. This step verify whether the end of the block was reached, in which case level decoding stops on step 18.22, otherwise processing loops back to step 18.2.

More generally, the sparse list above mentioned can be the list of values minus any predetermined level value, meaning the left level value or the above level value as mentioned above, but also any other predetermined level value, in combination or not with the level or above level value.

Figure 19:
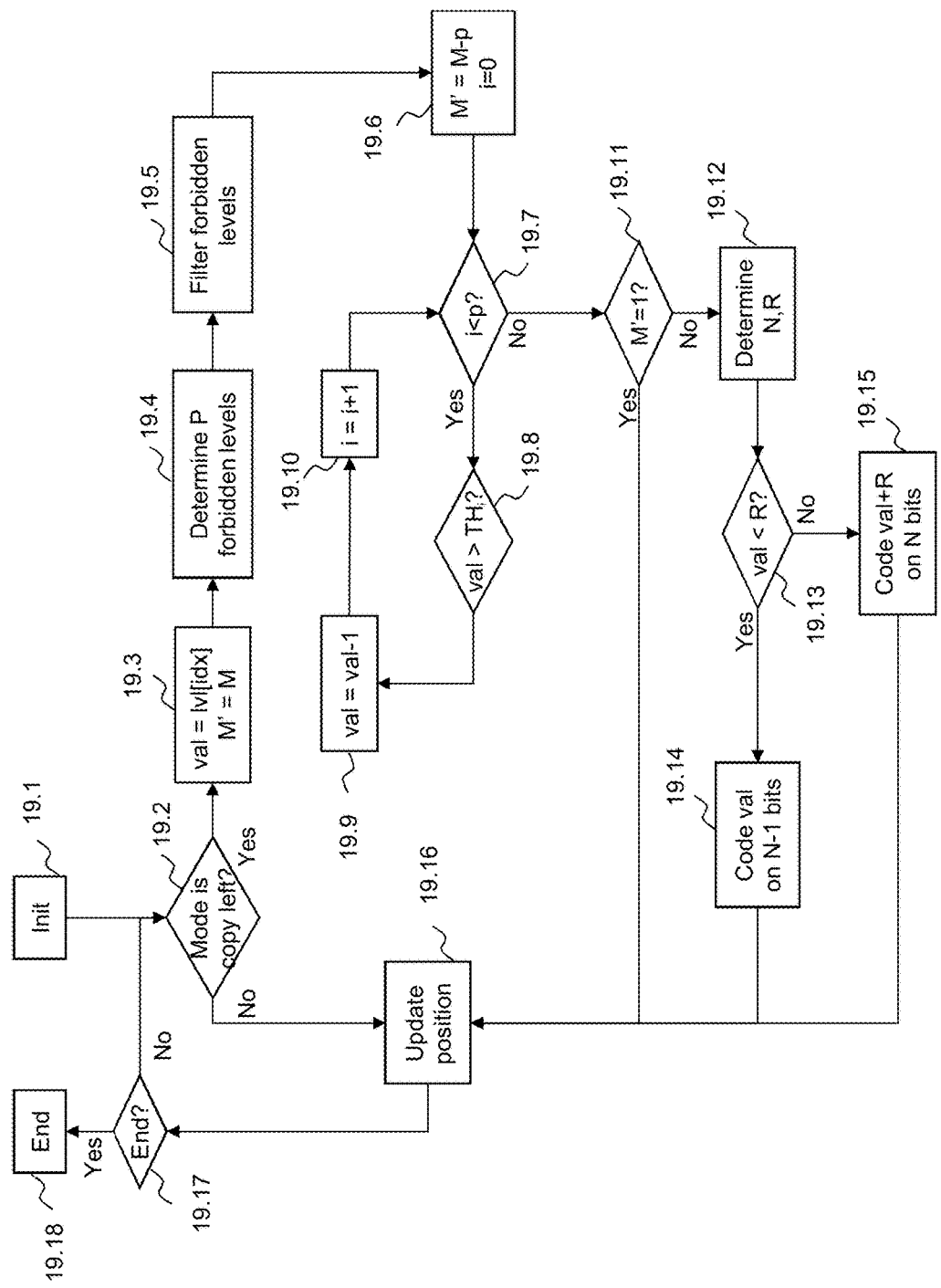
FIG. 19 illustrates the coding of the index taking into account a sparse index list in a more general context, when the list contains more than one missing level.

Another embodiment for updating the sparse list is illustrated in FIG. 19. This embodiment proposes a method for processing the sparse list when three or more predetermined level or index values exist, meaning three or more predicting modes are considered. In the preferred embodiment, if P is the number of available prediction modes, up to P−1 level values can be removed to get the sparse list. Indeed, if a level value needs to be coded using one of the prediction mode (for example "copy left"), it implies that none of the other modes (for example "copy up" or a mode called "transition mode" illustrated in FIG. 21) is selected, and in particular the associated level values are not possible. The same reasoning applies if the used mode is "copy up" or the "transition mode". In other words, if the mode of the previous index is either the "copy left" or "transition" mode, then the level on the left cannot be repeated, as the run on left would instead have been incremented by one to cover current pixel/level.

The processing is very similar to FIG. 17: steps are identical between the two figures, except steps 19.4 to 19.10 for taking into account that more than one level value in forbidden in the sparse list.

A step 19.4 allows determining the level values associated to P other modes, the list of these other modes possibly depending on the previously used mode. For example three modes can be considered: the "copy left" mode, the "copy up" mode and the transition mode which allows encoding the level value of a given pixel by implicit reference to a predetermined value of the pattern table. The pattern table contains the value of the last processed pixel, and the associated value of the current pixel(s) to encode. The transition mode is described more in detail below by reference to FIG. 21.

A first list L of forbidden levels is thus generated. Step 19.5 then filters list L into a reduced list L'. A first embodiment is to sort L in the decreasing order of levels, then to remove duplicate level values and to store the results in L'. Therefore if L equal to {6, 0, 4, 1, 6} then L' is equal to {6, 4, 1, 0}.

In another embodiment, as the sorting and removing of duplicates can be complex, only subsets of L are processed. For example, said subsets are such that a number Q of the smallest level values in the list L is obtained, and a number R such as R≤Q level values in L' are obtained, with the most obvious embodiment of R=Q=1.

The filtering process implies a new sorting of the current palette to take into account the forbidden level values. For instance if the current palette is equal to {0, 1, 2, 3, 4, 5, 6, 7}, it becomes {2, 3, 5, 7} after removing the forbidden level values of L'. The respective indexes 2, 3, 5 and 7 will then be respectively coded as 0, 1, 2 and 3 after the processing described below.

As a consequence, p level values (p being equal to L' size), such that 0≤p≤P (P being the number of modes), are determined, and the sparse list contains now M'=M−p elements. In a step 19.6 the size M' of the sparse list is computed. Moreover the first element in L' is selected by setting a loop counter i to 0.

Step 19.7 then checks whether there is an element left in L': if it is not, L' has been completely used, and processing resumes on step 19.11 which is similar to step 17.11 previously described. Otherwise, step 19.8 operates in the same fashion as step 17.9. A temporary variable $TH_i$ is set to the first value (i=0) of the reduced list L'.

If the value val is above the variable $TH_i$, then val is decremented on step 19.9 to take into account the sorting of the sparse list mentioned above. In any case, process continues to step 19.10 which selects the next level in L', e.g. by incrementing loop counter i. consequently the variable $TH_i$ takes a new value. Processing can then loop back to step 19.7.

Figure 20:
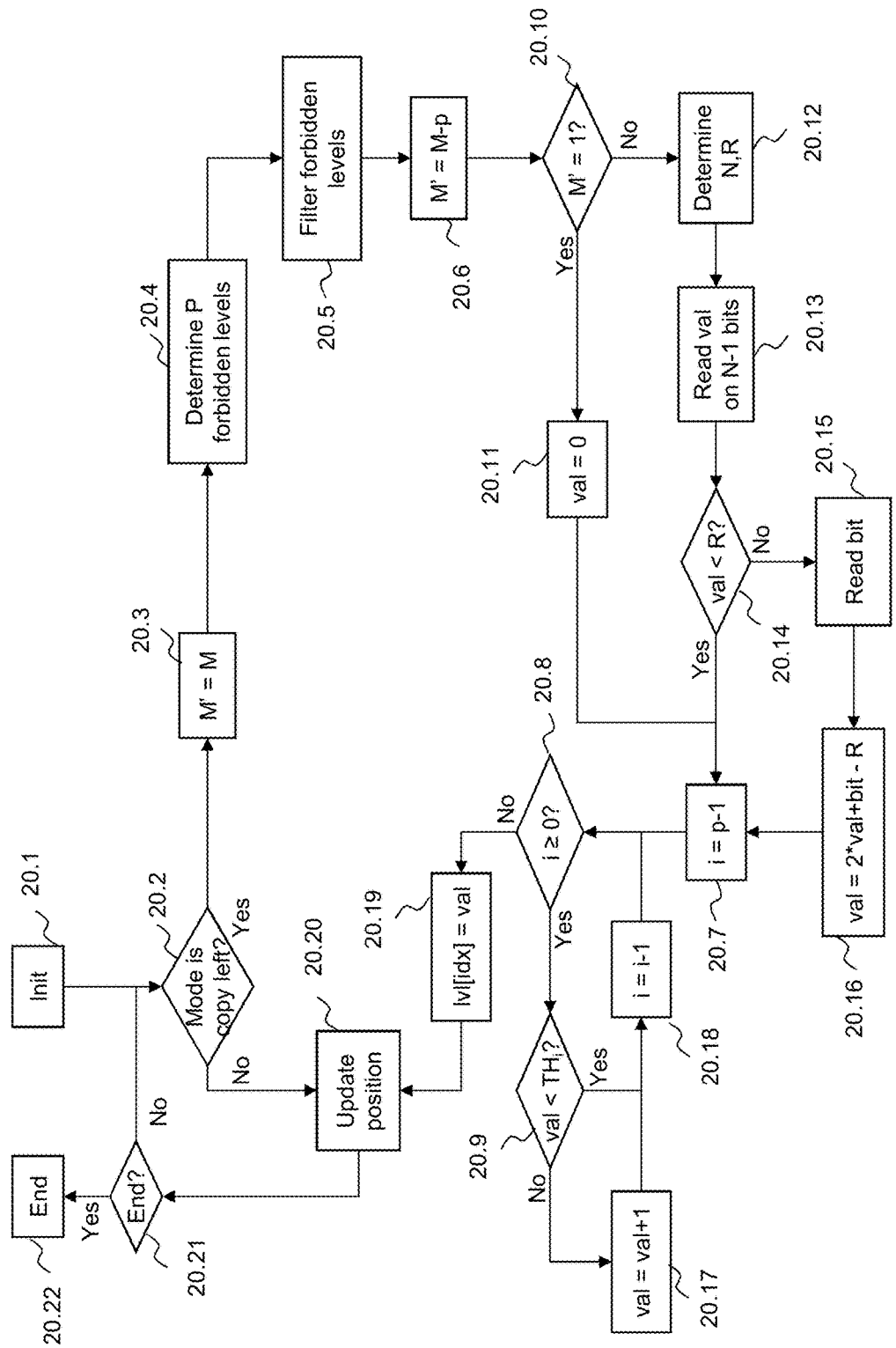
FIG. 20 illustrates the decoding of the index coded according to the coding process in FIG. 19.

FIG. 20 illustrates a corresponding decoding process. Steps 20.1 to 20.3, 20.10 to 20.16 and 20.20 to 20.22 are identical to their version in FIG. 18. Step 20.4 is identical to step 19.4. Step 20.5 may be identical to step 19.5. As a consequence, a list L' containing p elements is determined, leading to new size M'=M−p for the sparse list on step 20.6.

Then, the process described in step 19.7 to 19.10 is reversely done. Step 20.7 thus selects the highest level in the list L', e.g. by setting a loop counter to p−1. As p can be equal to 0 or the lowest level in L' was already processed, step 20.8 checks the loop counter. In this embodiment L' has been sorted in increasing order. If all elements in L' have been processed through steps 20.9, 20.17 and 20.18 (meaning all the possible values have been considered), the level value val has been fully decoded and it is affected on step 20.19. Otherwise val is compared to current level $TH_i$ of the list L' on step 20.9. If it is lower, no processing is needed else it is incremented on step 20.17. Finally through step 20.18 the next level of the list L' is selected by decrementing before going back to the test of step 20.8.

Depending on the process from step 19.7 to 19.10, the above-mentioned decoding process can be simplified. For instance, the list L' may contain up to one element, which allows reusing as is steps 18.17 to 18.19 provided TH has been properly set, e.g. as depicted by 18.6 or 18.7. One solution to obtain only one element in the list L' is to select the minimum level value from the list L to get the list L'.

According to another embodiment it is possible on step 20.5 to sort L in decrementing order and modify accordingly steps 20.7, 20.8 and 20.18.

Figure 21:
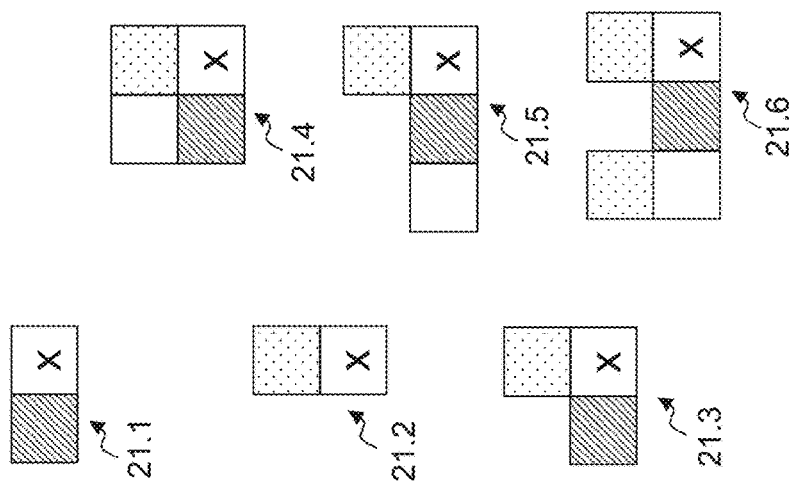
FIGS. 21a and 21b present a transition mode and a pattern table.

FIG. 21 split into two FIGS. 21a and 21b illustrates a mode of prediction named transition mode. According to a preferred embodiment, this mode is one of the prediction modes for the embodiment in FIGS. 19 and 20.

FIG. 21a presents patterns, i.e. the association of several neighbour palette levels and positions and levels. The gist of pattern encoding is to take advantage of redundancies in the block to encode. Typically, identical transitions occur in the block. This means that a subset of pixels may be found at different location of a block. Therefore, the transition mode stores some patterns, generally in a pattern table. A pattern defines a subset of pixels in a given disposition surrounding a target pixel. The value of the level of the target pixel is assumed to be the same for different occurrences of the pattern. In this case, the encoding of the Level value can be saved by using the pattern prediction mode. The actual value of the target pixel is obtained by looking in the stored pattern for a pattern corresponding to the actual surrounding of the target pixel. The Level value associated with the identified pattern in the pattern table gives the actual value of the level of the target pixel. Namely, a new prediction mode, called transition mode, allows encoding the Level value of a given pixel by implicit reference to a predetermined value of the pattern table.

For instance, pattern 21.1 associates the value of x to its left neighbour level, while 21.2 use the top neighbour, and 21.3 both. As illustrated by 21.4 to 21.6 it is understood that the nature of this so called pattern is diverse and the key property here is that it is possible to associate a particular level value to a neighbourhood of level values. FIG. 21b illustrates this process by associating the left level value of pattern 21.1 to the value x of the right level of 21.1. It is obvious to the man skilled in the art how this table can be adapted to any form of pattern. This table can be of course initialized or updated at any point of the encoding or decoding.

The following paragraphs describe additional preferred embodiments.

Figure 22:
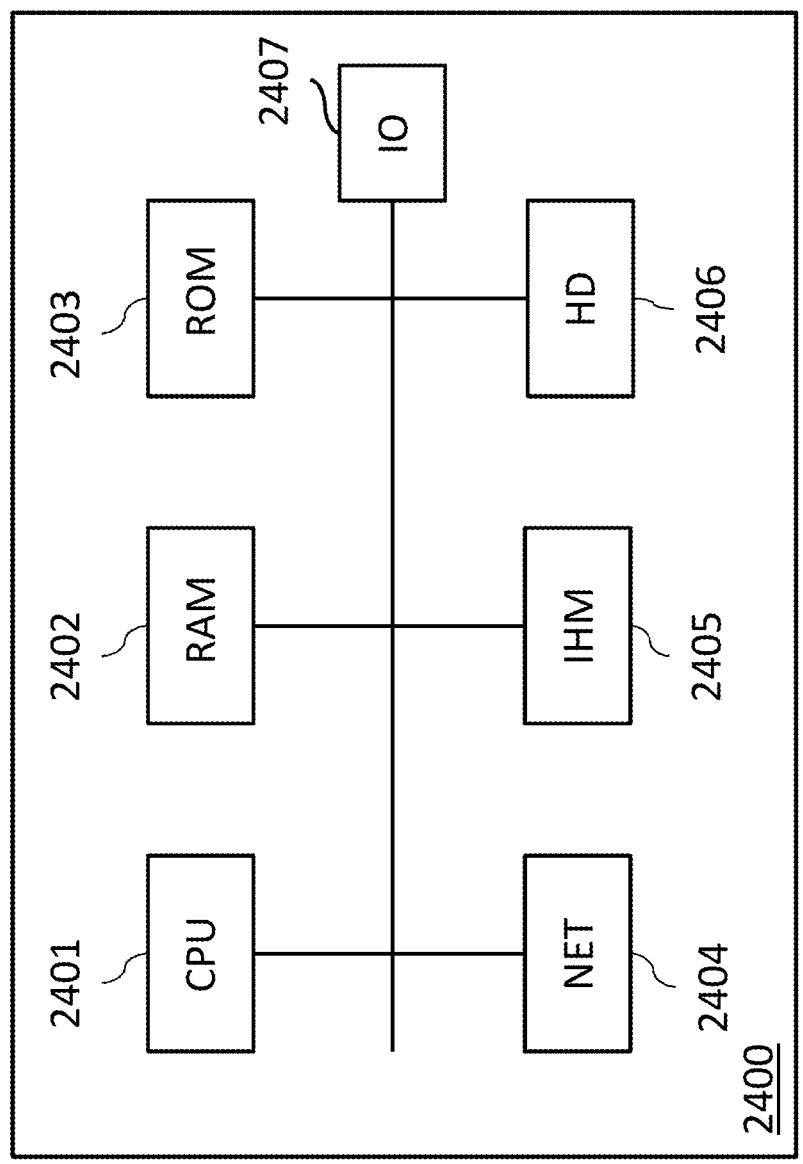
FIG. 22 illustrates a schematic block diagram of a computing device.

FIG. 22 is a schematic block diagram of a computing device 2400 for implementation of one or more embodiments of the invention. The computing device 2400 may be a device such as a micro-computer, a workstation or a light portable device. The computing device 2400 comprises a communication bus connected to:

a central processing unit 2401, such as a microprocessor, denoted CPU;

a random access memory 2402, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;

a read only memory 2403, denoted ROM, for storing computer programs for implementing embodiments of the invention;

a network interface 2404 is typically connected to a communication network over which digital data to be processed are transmitted or received.

The network interface 2404 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 2401;

a user interface 2405 may be used for receiving inputs from a user or to display information to a user;

a hard disk 2406 denoted HD may be provided as a mass storage device;

an I/O module 2407 may be used for receiving/sending data from/to external devices such as a video source or display.

The executable code may be stored either in read only memory 2403, on the hard disk 2406 or on a removable digital medium such as for example a disk. According to a variant, the executable code of the programs can be received by means of a communication network, via the network interface 2404, in order to be stored in one of the storage means of the communication device 2400, such as the hard disk 2406, before being executed.

The central processing unit 2401 is adapted to control and direct the execution of the instructions or portions of software code of the program or programs according to embodiments of the invention, which instructions are stored in one of the aforementioned storage means. After powering on, the CPU 2401 is capable of executing instructions from main RAM memory 2402 relating to a software application after those instructions have been loaded from the program ROM 2403 or the hard-disc (HD) 2406 for example. Such a software application, when executed by the CPU 2401, causes the steps of the flowcharts shown in FIGS. 6 to 7b and 10 to 20 to be performed.

In this embodiment, the apparatus is a programmable apparatus which uses software to implement the invention. However, alternatively, the present invention may be implemented in hardware (for example, in the form of an Application Specific Integrated Circuit or ASIC).

For example, a known mode called "escape mode" (see FIGS. 7b and 8b) consists in signaling, e.g. by using a specific level value, that a pixel cannot be represented by a level value, and that its pixel values are explicitly transmitted. A preferred embodiment is to insert the escape flag only if the Palette reaches the maximal number of values that it can contain. In this case, the Palette contains only MAX−1 indexes (MAX being the maximal number of values that it can contain), the value at the position MAX in the Palette being the escape level. In this case, the predetermined level value subtracted from the list of values is the last index of the Palette.

This last embodiment can be activated if the mode is copy left. For instance, by reference to the FIG. 17 (or FIG. 19), a new step between steps 17.2 and 17.3 would be added to decrease M by one. It will be appreciated by those skilled in the art that a specific level prediction mode (other than copy up or copy left) may or may not result in a specific sparse list and how to extend the concept presented here to this specific mode.

As mentioned in the prior art, the use of the palette without element is forbidden and the Palette_size is set equal to the decode side plus 1 (Palette_size−1 is encoded). In one embodiment, the value Palette_size equal to 1 is also forbidden. Indeed, in consists in using only one color in a palette to code a constant block and in a video codec, if one block contains the same value or about the same value for all pixels, other efficient modes exist. And in that case, the palette mode is really not optimal. For example, the intra DC mode is more efficient. So, this embodiment consists in changing the operation of the module 1003 of FIG. 10 by Palette_Size=Size+2

(instead of Palette_Size=Size+1)

All these embodiments can be combined.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A video encoder for encoding a digital image into a video bitstream for a decoder, wherein the digital image is one of a sequence of digital images forming video data, said video encoder comprising:

a palette generation unit configured to generate a palette having one or more palette entries associated to pixel values;

a determining unit configured to determine one or more values of indexes of a current block used for encoding one of a plurality of coding units of said digital image using said palette according to a palette coding mode, wherein each of the values of said indexes corresponds to a palette entry of said palette;

a processing unit configured to encode said indexes of the current block according to a given order of encoding using flags to be signalled in the bitstream, one or more of said flags indicating whether the value of a given index of the current block is (i) signalled in said bitstream or (ii) to be determined by copying the value of another index of the current block, and wherein in a case where, according to the given order of encoding, a current index of the current block is to be encoded following a previous index of the current block and (i) a flag to be associated with the current index in the current block indicates that the value of the current index is signalled in said bitstream, and (ii) a flag to be associated with the previous index indicates that the value of the previous index is to be determined by copying the value of another index located above the previous index in the current block, the value of the current index is determined by excluding the value of an index located above the current index in the block; and a processing unit configured to encode said digital image into said video bitstream using the determined value of the current index.

2. A method of operating an encoder for encoding a digital image into a video bitstream for a decoder, wherein the digital image is one of a sequence of digital images forming video data, wherein said method comprises:

generating a palette having one or more palette entries associated to pixel values;

determining one or more values of indexes of a current block used for encoding one of a plurality of coding units of said digital image using said palette according to a palette coding mode, wherein each of the values of said indexes correspond to a palette entry of said palette;

encoding said indexes of the current block according to a given order of encoding using flags to be signalled in the bitstream, one or more of said flags indicating whether the value of a given index of the current block is (i) signalled in said bitstream or (ii) to be determined by copying the value of another index of the current block, and wherein in a case where, according to the given order of encoding, a current index of the current block is to be encoded following a previous index of the current block and (i) a flag to be associated with the current index in the current block indicates that the value of the current index is signalled in said bitstream, and (ii) a flag to be associated with the previous index indicates that the value of the previous index is to be determined by copying the value of another index located above the previous index in the current block, the value of the current index is determined by excluding the value of an index located above the current index in the current block; and encoding said digital image into said video bitstream using the determined value of the current index.

3. The method according to claim 2, wherein the determined value of the current index is used as the value for each index in a run of one or more consecutive indexes in the block that comprise the current index.

4. A method of operating a decoder for decoding a digital image from an input video bitstream, wherein the digital image is one of a sequence of digital images forming video data, wherein said method comprises:

generating a palette having one or more palette entries associated to pixel values;

determining one or more values of indexes of a current block used for decoding one of a plurality of coding units of said digital image using said palette according to a palette coding mode, wherein each of the values of said indexes correspond to a palette entry in said palette;

decoding said indexes of the current block according to a given order of decoding using flags signalled in the bitstream, one or more of said flags indicating whether the value of a given index of the current block is (i) signalled in said bitstream or (ii) to be determined by copying the value of another index of the current block; and wherein in a case where, according to the given order of decoding, a current index of the current block is to be decoded following a previous index of the current block, and (i) a flag associated with the current index in the current block indicates that the value of the current index is signalled in said bitstream, and (iii) a flag associated with the previous index indicates that the value of the previous index is to be determined by copying the value of another index located above the previous index in the current block, the value of the current index is determined by excluding the value of an index located above the current index in the current block; and decoding said digital image from the input video bitstream using the determined value of the current index.

5. The method according to claim 4, wherein the determined value of the current index is used as the value for each index in a run of one or more consecutive indexes in the current block.

6. A video decoder for decoding a digital image from an input video bitstream, wherein the digital image is one of a sequence of digital images forming video data, said video decoder comprising:

generating a palette having one or more palette entries associated to pixel values;

a determining unit configured to determine one or more values of indexes of a current block used for decoding one of a plurality of coding units of said digital image using said palette according to a palette coding mode, wherein each of the values of said indexes correspond to a palette entry of said palette;

a decoding unit configured to decode said indexes of the current block according to a given order of decoding using flags signalled in the bitstream, one or more of said flags indicating whether the value of a given index of the current block is (i) signalled in said bitstream or (iii) to be determined by copying the value of another index of the current block; and wherein in a case where, according to the given order of decoding, a current index of the current block is to be decoded following a previous index of the current block, and (i) a flag associated with the current index indicates that the value of the current index is signalled in said bitstream and (ii) a flag associated with the previous index indicates that the value of the previous index is to be determined by copying the value of another index located above the previous index in the current block, the value of the current index is determined by excluding the value of an index located above the current index in the current block; and a processing unit configured to decode said digital image from the input video bitstream using the determined value of the current index.

7. A non-transitory computer readable carrier medium which, when run on an encoder, causes the encoder to carry out a method for encoding a digital image into a video bitstream for a decoder, wherein the digital image is one of a sequence of digital images forming video data, wherein said method comprises:

generating a palette having one or more palette entries associated to pixel values;

determining one or more values of indexes of a current block used for encoding one of a plurality of coding units of said digital image using said palette according to a palette coding mode, wherein each of the values of said indexes correspond to a palette entry of said palette;

encoding said indexes of the current block according to a given order of encoding using flags to be signalled in the bitstream, one or more of said flags indicating whether the value of a given index of the current block is (i) signalled in said bitstream or (iii) to be determined by copying the value of another index of the current block, and wherein in a case where, according to the given order of encoding, a current index of the current block is to be encoded following a previous index of the current block and (i) a flag to be associated with the current index in the current block indicates that the value of the current index is signalled in said bitstream, and (ii) a flag to be associated with the previous index indicates that the value of the previous index is to be determined by copying the value of another index located above the previous index in the block, the value of the current index is determined by excluding the value of an index located above the current index in the current block; and encoding said digital image into said video bitstream using the determined value of the current index.

8. A non-transitory computer readable carrier medium which, when run on a decoder, causes the decoder to carry out a method for decoding a digital image from a video bitstream, wherein the digital image is one of a sequence of digital images forming video data, wherein said method comprises:

generating a palette having one or more palette entries associated to pixel values;

determining one or more values of indexes of a current block used for decoding one of a plurality of coding units of said digital image using said palette according to a palette coding mode, wherein each of the values of said indexes correspond to palette entries in said current palette;

decoding said indexes of the current block according to a given order of decoding using flags signalled in the bitstream, one or more of said flags indicating whether the value of a given index of the current block is (i) signalled in said bitstream or (ii) to be determined by copying the value of another index of the current block; and wherein in a case where, according to the given order of decoding, a current index of the current block is to be decoded following a previous index of the current block, and (i) a flag associated with the current index indicates that the value of the current index is signalled in said bitstream and (ii) a flag associated with the previous index indicates that the value of the previous index is to be determined by copying the value of another index located above the previous index in the current block, the value of the current index is determined by excluding the value of an index located above the current index in the current block; and decoding said digital image from said video bitstream using the determined value of the current index.

* * * * *